(12) United States Patent
Wilson

(10) Patent No.: US 10,477,786 B1
(45) Date of Patent: Nov. 19, 2019

(54) TWO-STAGE AEROPONIC GROWING SYSTEM AND METHOD

(71) Applicant: Eric John Wilson, Klamath Falls, OR (US)

(72) Inventor: Eric John Wilson, Klamath Falls, OR (US)

(73) Assignee: Eric John Wilson, North Bend, WA (US)

( * ) Notice: Subject to any disclaimer, the term of this patent is extended or adjusted under 35 U.S.C. 154(b) by 189 days.

(21) Appl. No.: 15/809,420

(22) Filed: Nov. 10, 2017

Related U.S. Application Data

(60) Provisional application No. 62/421,917, filed on Nov. 14, 2016.

(51) Int. Cl.
*A01G 31/06* (2006.01)
*A01G 9/04* (2006.01)
*A01G 27/00* (2006.01)
*A01G 9/24* (2006.01)

(52) U.S. Cl.
CPC ............. *A01G 31/06* (2013.01); *A01G 9/042* (2013.01); *A01G 9/045* (2013.01); *A01G 9/247* (2013.01); *A01G 27/003* (2013.01)

(58) Field of Classification Search
CPC .................. A01G 9/028; A01G 9/0297; A01G 2009/003; A01G 31/06; A01G 9/045
See application file for complete search history.

(56) References Cited

U.S. PATENT DOCUMENTS

| | | |
|---|---|---|
| 4,075,785 A | 2/1978 | Jones et al. |
| 4,255,896 A | 3/1981 | Carl |
| 4,379,375 A | 4/1983 | Eisenberg et al. |
| 4,642,939 A | 2/1987 | Suzuki |
| 4,869,019 A * | 9/1989 | Ehrlich .................. A01G 31/06 47/62 A |
| 5,136,804 A | 8/1992 | Rothem et al. |
| 5,502,923 A * | 4/1996 | Bradshaw .............. A01G 31/06 47/62 A |
| 5,561,943 A | 10/1996 | Valstar |
| 5,617,673 A | 4/1997 | Takashima |
| 5,937,575 A | 8/1999 | Zobel et al. |
| 6,021,602 A | 2/2000 | Orsi |
| 6,508,033 B2 | 1/2003 | Hessel et al. |
| 6,604,321 B2 | 8/2003 | Marchildon |

(Continued)

*Primary Examiner* — Monica L Williams

(57) ABSTRACT

A two-stage aeroponic growing system and method provides a cylindrical container and a sloped container that independently, or in conjunction, work to expose vegetation to nutrients, liquids, and light in two successive stages. A substrate, such as a Grodan® plug, initiates growth of the vegetation. The cylindrical and sloped containers provide a surface for the roots and fibers of the substrate to engage, and also have various apertures on all surfaces that enable 360° exposure to nutrients, liquids, and light. In the second stage of growth, the substrate snugly positions inside the cylindrical container. The sloped container snugly retains the cylindrical container. The sloped container has a sloped lid of about 6° that creates greater space for retaining multiple cylindrical containers. Drain holes and spray nozzles help control moisture exposure in the sloped container to create a controlled environment for the second stage growth of the vegetation.

20 Claims, 21 Drawing Sheets

(56) References Cited

U.S. PATENT DOCUMENTS

| | | | |
|---|---|---|---|
| 7,080,482 B1* | 7/2006 | Bradley | A01G 31/02 47/60 |
| 7,134,240 B1 | 11/2006 | Neal | |
| 7,181,886 B2 | 2/2007 | Bourgoin et al. | |
| 7,730,663 B2 | 6/2010 | Souvlos et al. | |
| 7,823,328 B2 | 11/2010 | Walhovd | |
| 8,250,809 B2 | 8/2012 | Simmons | |
| 8,484,890 B2 | 7/2013 | Simmons | |
| 8,505,238 B2 | 8/2013 | Lubbers et al. | |
| 8,533,933 B2 | 9/2013 | Pettibone | |
| 8,782,948 B2 | 7/2014 | Harwood et al. | |
| 9,648,811 B2 | 5/2017 | Narasipur | |
| 2002/0162275 A1 | 11/2002 | Robinson | |
| 2004/0111965 A1 | 6/2004 | Agius | |
| 2004/0237396 A1 | 12/2004 | Castillo | |
| 2005/0011118 A1 | 1/2005 | Umbaugh | |
| 2007/0251145 A1 | 11/2007 | Brustatore | |
| 2009/0165373 A1 | 7/2009 | Souvlos et al. | |
| 2011/0023359 A1 | 2/2011 | Raring | |
| 2013/0255145 A1 | 10/2013 | Wiggins | |
| 2014/0000162 A1 | 1/2014 | Blank | |
| 2014/0020292 A1 | 1/2014 | McNamara et al. | |
| 2018/0000021 A1* | 1/2018 | Parker | A01G 9/027 |
| 2018/0092314 A1* | 4/2018 | McGuinness | A01G 9/023 |

* cited by examiner

TWO-STAGE AEROPONIC GROWING SYSTEM AND METHOD

CROSS-REFERENCE TO RELATED APPLICATIONS

This application claims priority to U.S. provisional application No. 62/421,917, filed Nov. 14, 2017, entitled "Two-Stage Aeroponic Growing System and Method" which application is incorporated herein in its entirety.

FIELD OF THE INVENTION

The present invention relates generally to a two-stage aeroponic growing system and method. More so, the present invention relates to a growing system and method that provides a cylindrical container and a sloped container that independently, or in conjunction, exposes vegetation to optimum distribution of nutrients, liquids, and light during two successive growth stages of the vegetation.

BACKGROUND OF THE INVENTION

It is known that various efforts including hydroponic and aeroponic methods have been made to grow plants other than the traditional method of growing in soil. Hydroponics is a method of growing plants using mineral nutrient liquid solutions instead of soil. It provides healthier plants that grow faster than those grown in soil. Although in hydroponics the plants are grown in the absence of soil, the roots are maintained in a liquid environment. Consequently, one of the reasons hydroponics is not widely accepted is because of the lack of adequate ventilation at the roots from the continuous presence of water is a major cause of root disease. Also, a continuous liquid environment further invites parasites such as mosquitoes to grow in the liquid environment resulting in increased threats of harmful disease.

To solve these problems, aeroponics methods for growing plants have been developed. Aeroponics is the process of growing plants in an air or mist environment without the use of soil or an aggregate medium. Importantly, aeroponics methods for growing plants are efficient in indoor as well as outdoor environments. When plants are grown using aeroponics methods under a lamp in a flat bed, the plants are at varying distances from the lamp or light source. Thus rotary growing apparatuses in which the plants are rotated about a light source can be used so as to reduce the number of lights needed for each productive square unit of growing area.

Numerous innovations have been provided in the prior art that are adapted to aeroponics method for growing plants. Even though these innovations may be suitable for the specific purposes to which they address, they would not however, be as suitable for the purposes of the present invention.

For example, U.S. Pat. No. 4,075,785 to Jones discloses a method for growing plants from seeds to commercial maturity, comprising implanting a plant seed within a porous root-permeable shaped support body, moistening the shaped support body until the seed germinates, then periodically feeding the plant by applying hydroponic nutrient solution to the roots and periodically exposing the foliage to actinic radiation.

U.S. Pat. No. 7,181,886 to Bourgoin et al. discloses a hydroponic/aeroponic agricultural unit that features the ability of quickly changing from a small housing into a larger housing by varying the diameter of a drum so that a small drum can act as a nursery for seedlings. A system allows for the rotation of the drum to provide uniform light and liquid nutrients.

U.S. Pat. No. 7,823,328 to Walhovd teaches an aeroponic plant growing system that includes a pump, a water distribution manifold, and water lines used to provide water and nutrients from a water reservoir to sprayers in growing chambers where the water and nutrients are sprayed on the roots of plants growing therein. Non-absorbed water and nutrients are returned to the water reservoir via a filter that supports the colonization of organisms useful for plant growth.

U.S. Pat. No. 8,250,809 to Simmons discloses a self-contained apparatus for aeroponically growing and developing plants that comprises a reservoir for containing a liquid nutrient solution, a conical tower, a power supply, and a pump to move the liquid nutrient solution through the apparatus. Part of the nutrient solution dispersed into the conical tower is absorbed by the exposed root mass and rest un-absorbed liquid nutrient solution is returned to the reservoir to be reused.

U.S. Pat. No. 8,484,890 to Simmons describes an aeroponic growing system comprising a plurality of plant supports comprise a liquid nutrient solution guide to spray nutrients by using a distribution pipe, multiple different sprayers. Each plant support includes at least one opening adapted to retain at least one seed in a seed container.

U.S. Pat. No. 8,505,238 to Luebbers et al. teaches an aeroponic plant growing system with vertically aligned planting sites. The system includes a plurality of plant-holding containers held at 45 degrees to the horizontal, a walled enclosure, and a fluid dispenser housed therein.

U.S. Pat. No. 7,730,663 to Souvlos et al. discloses a rotary plant growing apparatus has a cylindrical structure consisting of a plurality of baskets in which plants may be grown and rotates such that the baskets are at least partially immersed in nutrient reservoir containing a liquid nutrient for nourishing the plants.

U.S. Pat. No. 8,782,948 to Harwood et al. describes a system and method of aeroponic farming includes depositing seeds in a flat containing micro-fleece cloth and placing the flat within a growth chamber. The upper side of the flat is subjected to light of the proper frequencies to promote growth in plants. A nutrient solution is sprayed onto the micro-fleece cloth and the developing root mass of the plants, while controlling temperature, humidity, and carbon dioxide within the growth chamber. The growth chambers can be stacked on each other and/or located side by side to save space within a facility.

U.S. Pat. No. 9,648,811 to Narasipur teaches a system and method for aeroponic plant growth involving closed loops of growing units linked by plumbing sections. Each of the growing units comprises an enclosure containing a submersible pump and a spray manifold, an electronic cyclic sequencer being operatively connected to each of the submersible pumps.

U.S. Patent Application No. 2004/0237396 to Castillo discloses a germination device for the production of sprouts, wherein the device comprises an automatically, time-controllably, and intermittently rotating the container and an intermittently activatable set-up for spray irrigation of seeds placed in the container for germinating the seeds.

U.S. Patent Application No. 2005/0011118 to Umbaugh describes a seed germination and plant supporting utility that is useful in aeroponic growing systems, hydroponic growing systems, and/or for seed germination and initial seedling growth in preparation for planting. It provides a seed germination pod that supports a seedling to full growth after germination. Mesh is held spaced apart by spacer. As a seed deposited on upper mesh develops its first roots during germination, the roots grow through mesh to develop hair roots. This provides firm bedding for the roots at mesh and causes the plant to grow straight towards its light source.

U.S. Patent Application No. 2011/0023359 to Raring teaches an apparatus and method for improving aeroponic horticulture growing efficiency by delivering plant roots with air and liquid nutrients where the liquid is atomized into a cloud of droplets of a small particle size generally under 30 microns diameter, thereby preserving and encouraging root hair growth. The droplets are produced via a sonic nozzle.

U.S. Patent Application No. 2014/0000162 to Blank discloses an aeroponic growing method and system comprising an overhead support to suspend at least one vertical column of interconnected growing pots and a supply conduit that is in fluid communication with a top of the vertical column of interconnected growing pots and a return conduit in fluid communication with a bottom of the vertical column of interconnected growing pots. In addition, a turning mechanism may also be used for rotating the column to achieve uniformity of illumination.

It is apparent that numerous innovations which are adapted to aeroponics methods for growing plants have been developed in the prior art and are adequate for various purposes. Even though these innovations may be suitable for the specific purposes to which they address, they would not be suitable for the purposes of the present invention as heretofore described. Thus a two-stage aeroponic growing system and method, whereby a first stage of growth involves growth of seedlings in a substrate positioned in a cylindrical container while the second stage of growth is stimulated in a sloped container to hold pluralities of cylindrical container in a controlled manner to provide uniform exposure to moisture, nutrients and lights to grow seedlings and plants is therefore needed.

SUMMARY OF THE INVENTION

The present invention discloses a growing system and method which provide a cylindrical container and a sloped container that independently, or in conjunction, expose vegetation to nutrients, liquids, and light in two successive stages; whereby growth of the vegetation is initiated with a substrate comprising a block of mineral fibers and defined by a restricted volume; whereby a first stage of growth involves growth of the seedlings in the substrate while the substrate snugly positions inside the cylindrical container; whereby in the second stage of growth, the seedlings have grown tall on the limited volume substrate, and the cylindrical container couples to the sloped container, offering a larger volume for continued growth and harvesting of the vegetation; whereby the cylindrical container forms a snug fit around the substrate and helps inhibit excess moisture from engaging the substrate; whereby the sloped container provides a sealed, controlled moisture environment, optimizes spacing of cylindrical containers and substrates, and also meets federal guidelines for containers that grow food.

According to one aspect of the present invention a two-stage aeroponic growing system includes at least one cylindrical container comprising a generally cylindrical sidewall that forms a generally cylindrical cavity, the cylindrical sidewall defined by a plurality of spaced-apart, elongated side apertures, a closed end defined by a plurality of spaced-apart end apertures, and an open end terminating at a circumferential edge, whereby a rim extending around the circumferential edge of the at least one cylindrical container; a cylindrical lid defined by a first face, a second face, and a plurality of lid apertures, the cylindrical lid configured to engage the circumferential edge of the at least one cylindrical container, the cylindrical lid further configured to regulate access to the cylindrical cavity of the at least one cylindrical container; a sloped container comprising a tray that forms at least one drain hole, the tray surrounded by a first wall, a pair of lateral walls and a generally sloped second wall, the walls having an upper free edge, the tray and the walls forming a cavity, further the sloped container comprising at least one fluid supply hole; a curved lid having a sloped surface and a circumferential edge configured to mount on to the upper edge of the walls of the sloped container, the sloped surface of the curved lid comprises a central horizontal plane surface and a plurality of gradually sloped plane surfaces from both sides of the central horizontal plane surface, whereby each of the gradually sloped plane surfaces are at a predetermined gradient from the adjacent plane surface, further each of the plane surfaces comprises a plurality of rows of evenly, spaced-apart holes which are configured to enable holding at least one cylindrical container, whereby the rim engages the curved lid allowing the at least one cylindrical container fixedly coupled to the sloped container at a predetermined angle; and at least one nozzle attached to the fluid supply hole of the sloped container, wherein the at least one nozzle is configured to controllably spray a fluid in the cavity of the sloped container.

According to another aspect of the present invention a method for aeroponic growing of vegetation in two stages includes providing a substrate for growing vegetation, the substrate comprising a block of mineral fibers and defined by a restricted volume; providing a cylindrical container having a continuous cylindrical sidewall that forms a cylindrical cavity, an open end, and a closed end, the cylindrical container comprising a rim extending around circumferential edge of an open end of the at least one cylindrical container; positioning the substrate in the cylindrical cavity in a snug relationship; initiating a first stage of growth of the vegetation; providing a sloped container comprising a tray surrounded by a first wall, a pair of lateral walls, and a generally sloped second wall, the walls having an upper free edge, wherein the tray and the walls form a cavity, the sloped container comprising at least one fluid supply hole and at least one drain hole; providing a curved lid having a sloped surface and a circumferential edge configured to mount on to the upper edge of the walls of the sloped container, the sloped surface of the curved lid comprises a central horizontal plane surface and a plurality of gradually sloped plane surfaces from both sides of the central horizontal plane surface, whereby each of the gradually sloped plane surfaces are at a predetermined gradient which form an adjacent plane surface, each of the plane surface comprises a plurality of rows of evenly, spaced-apart holes; coupling the cylindrical containers to the sloped container through the plurality of holes on the sloped surface of the curved lid, whereby the rim of the cylindrical containers engage the sloped surface, thereby allowing the closed end of each of the cylindrical containers angled towards a center of the cavity of the sloped container while the open end of each of the cylindrical containers is angled outwards from the curved lid of the sloped container; initiating a second stage of growth of the vegetation; spraying a fluid into the cavity of the sloped container by at least one nozzle attached to the at least one fluid supply hole; and draining excess fluid from the sloped container through the at least one drain hole.

In view of the foregoing, it is therefore an object of the present invention to provide a two-stage growing system that controls moisture, light, and nutrients supplied to vegetation in a substrate such as a Grodan® block.

Another objective is to provide an improved system and method for propagating vegetation growth under aeroponic conditions by the intermittent application to a substrate and roots through uniform exposure to moisture, lights, and nutrients.

Another objective is to at least partially replace substrates with the cylindrical container.

Another objective is to provide a restricted volume of growth in the first stage.

Another objective is to expand the volume of growth in the second stage, while optimizing the quantity of vegetation that can be grown.

Another objective is to provide a system and method for two-stage growth of vegetation which is adaptable both to commercial greenhouse and domestic home use conditions.

Yet another objective is to provide a system and method for two-stage growth of vegetation which shortens propagation time, increases plant survival, and produces a healthier plant using less space than currently applied techniques.

Yet another objective is to save a substantial cost in substrates by using the cylindrical container.

Yet another objective is to provide a sloped container having plurality a of holes, thereby allowing the individual cylindrical containers positioned inclined at a predetermined angle to facilitate slow and sustained gravity return feed of the nutrient solution back to the reservoir.

Yet another objective is to provide predetermined inclination of each plant allowing more uniform light distribution as well as more uniform spray of liquid nutrients while accommodating a larger number of plants and/or offering a larger volume for the continued growth of the vegetation, and also enabling more efficient harvesting of the vegetation.

Other objectives and aspects of the invention will become apparent from the following detailed description, taken in conjunction with the accompanying drawings, which illustrates, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
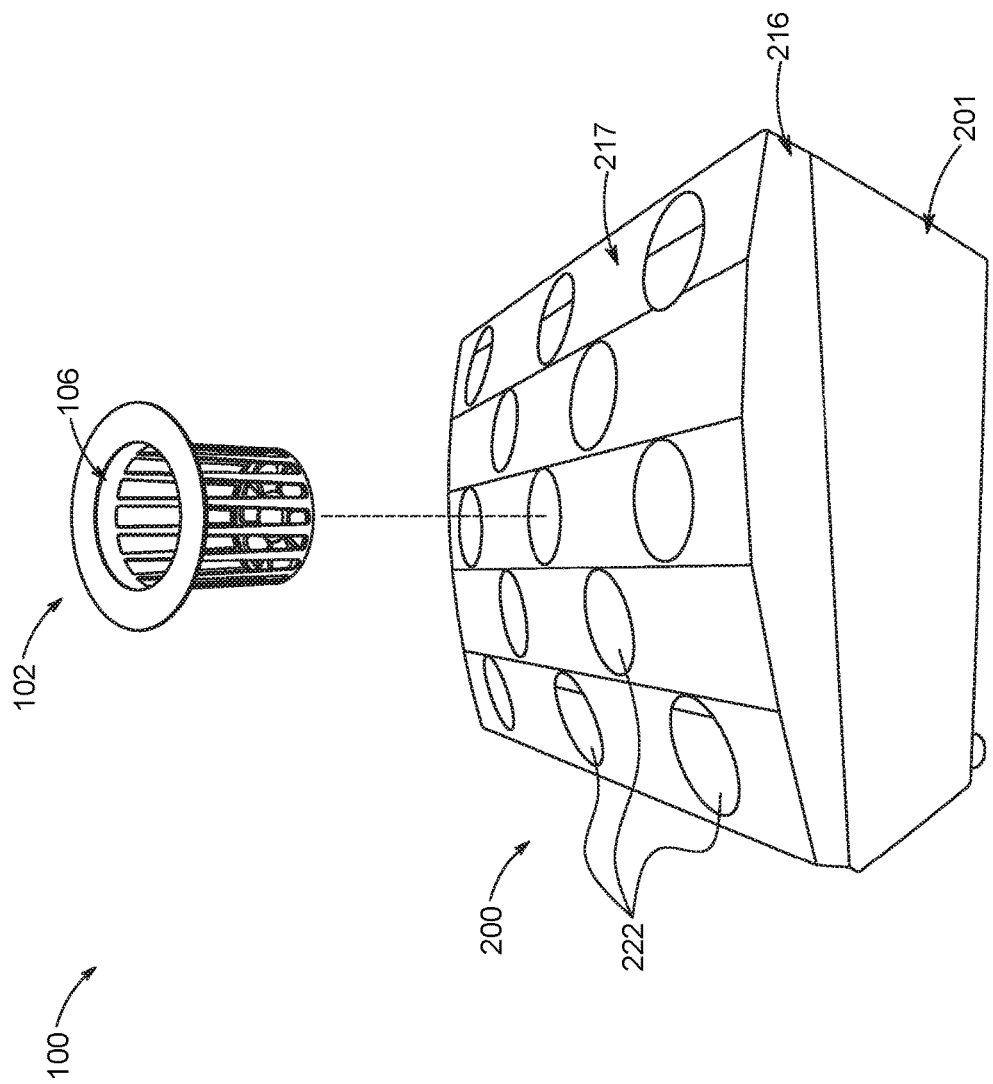
FIG. 1 illustrates a perspective view of an exemplary cylindrical container and a sloped container for a two-stage aeroponic growing system, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1-26. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A two-stage aeroponic growing system 100 and method 300 is referenced in FIGS. 1-26. The growing system 100 and method 300 provide a cylindrical container 102 and a sloped container 200 that independently, or in conjunction, work to controllably expose vegetation to moisture, nutrients, light, and fertilizer liquids in two successive stages. A substrate (not shown) initiates the growth of the vegetation. The substrate may include a block of mineral fibers, and is defined by a restricted volume.

In one embodiment, the substrate is a Grodan® plug that is sized and dimensioned to snugly fit in the cylindrical container 102. The cylindrical and sloped containers 102, 200 provide a surface for the fibrous minerals of the substrate, and the roots of the vegetation to engage during growth. The containers 102, 200 also have various apertures that form on all surfaces to enable 360° exposure to nutrients, liquids, and light.

In some embodiments, a first stage of growth involves growth of seedlings in the substrate. The substrate snugly positions inside the cylindrical container 102 throughout the first stage of growth until the seedlings reach a predetermined height. In the second stage of growth, the seedlings have grown tall on the limited volume environment offered by the substrate and the cylindrical container 102. At this point, the cylindrical container 102 couples to the sloped container 200, offering a larger volume for the continued growth of the vegetation, and also enabling more efficient harvesting of the vegetation. The sloped container 200 snugly retains the cylindrical container 102 and helps control spraying and draining of liquids. This creates a controlled environment for the second stage growth of the vegetation.

The sloped container 200 provides a sealed, controlled moisture environment, optimizes spacing of vegetation to maximize growth, and meets federal guidelines for general containers that are used to grow food. The second stage of growth is enhanced by coupling the cylindrical container 102 to the sloped container 200. This creates a sealed moisture environment that regulates spraying, draining, and spacing of the vegetation. The sloped disposition of the sloped container 200 allows greater spacing so that maximum amount of cylindrical containers 102 can be coupled to the sloped container 200. This gradient slope of about 6° creates more space for multiple cylindrical containers 102 to be positioned for enhanced vegetation growth.

In one aspect, the two-stage aeroponic growing system 100, comprises: at least one cylindrical container 102 comprising a generally cylindrical sidewall 104 that forms a generally cylindrical cavity 106, the cylindrical sidewall 104 defined by a plurality of spaced-apart, elongated side apertures 108a, 108b, 108c, a closed end 110 defined by a plurality of spaced-apart end apertures 112a, 112b, and an open end 114 terminating at a circumferential edge 116, the at least one cylindrical container 102 further comprising a rim 118 extending around the circumferential edge 116 of the at least one cylindrical container 102; a cylindrical lid 120 defined by a first face 124, a second face 126, and a plurality of lid apertures 122a, 122b, 122c, the cylindrical lid 120 configured to engage the circumferential edge 116 of the at least one cylindrical container 102, the cylindrical lid 120 further configured to regulate access to the cylindrical cavity 106 of the at least one cylindrical container 102; a sloped container 200 comprising a tray 202 that forms at least one drain hole 204a, 204b configured to controllably drain a liquid, the tray 202 surrounded by a first wall 206, a pair of lateral walls 208a, 208b and a generally sloped second wall 210, the walls 206, 208a-b, 210 having an upper free edge 212, the tray 202 and the walls 206, 208a-b, 210 forming a cavity 214, further the sloped container 200 comprising at least one fluid supply hole; a generally curved lid 216 having a sloped surface 217 and a circumferential edge 218 configured to detachably attach to the upper free edge 212 of the walls 206, 208a-b, 210 of the sloped container 200, further the sloped surface 217 of the curved lid comprises a central horizontal plane surface 217a and plurality of gradually sloped plane surfaces 217b-e from both sides of the central horizontal plane surface 217a, whereby each of the gradually sloped plane surfaces 217b-e are at a predetermined gradient from the adjacent plane surface, further each of the plane surface 217a-e comprises a plurality of rows of evenly, spaced-apart holes 222 that are configured to enable holding at least one cylindrical container 102, whereby the rim 118 engages the curved lid 216 allowing the at least one cylindrical container 102 fixedly couples to the sloped container

200 at a predetermined angle; and at least one nozzle 224a, 224b attached to the fluid supply hole 205a, 205b of the sloped container 200, wherein the at least one nozzle 224a, 224b configured to controllably spray a fluid in the cavity 214 of the sloped container 200.

In another aspect of the present invention, a method 300 for aeroponic growing of vegetation in two stages, the method 300 includes Step 302 of providing a substrate for growing vegetation, the substrate comprising a block of mineral fibers and defined by a restricted volume; Step 304 of providing a cylindrical container having a continuous cylindrical sidewall that forms a cylindrical cavity, an open end, and a closed end, further a rim extending around circumferential edge of the open end of the at least one cylindrical container; Step 306 of positioning the substrate in the cylindrical cavity in a snug relationship; Step 308 of initiating a first stage of growth of the vegetation; Step 310 of providing a sloped container comprising a tray surrounded by a first wall, a pair of lateral walls, and a generally sloped second wall, the walls having an upper free edge, wherein the tray and the walls forming a cavity, further the sloped container comprising at least one fluid supply hole and at least one drain hole, wherein the sloped container further comprising a curved lid having a sloped surface and a circumferential edge configured to mount on to the upper edge of the walls of the sloped container, further the sloped surface of the curved lid comprises a central horizontal plane surface and plurality of gradually sloped plane surfaces from both sides of the central horizontal plane surface, whereby each of the gradually sloped plane surfaces are at a predetermined gradient form the adjacent plane surface, further each of the plane surface comprises a plurality of rows of evenly, spaced-apart holes; Step 312 of coupling the cylindrical containers to the sloped container through the plurality of holes on the sloped surface of the curved lid, whereby the rim the cylindrical containers engage the sloped surface, thereby allowing the closed end of each of the cylindrical containers angled towards the center of the cavity of the sloped container while the open end of each of the cylindrical containers angled outwards from the curved lid of the sloped container; Step 314 of initiating a second stage of growth of the vegetation; Step 316 of spraying a fluid into the cavity of the sloped container by at least one nozzle attached to the at least one fluid supply hole; and Step 318 of draining excess fluid from the sloped container through the at least one drain hole.

According to another aspect of the present invention, the substrate is configured to fit snugly in cylindrical cavity 106 of the at least one cylindrical container 102, the substrate comprising a block of mineral fibers including Grodan® plug.

According to another aspect of the present invention, the height of the cylindrical container 102 ranged from about 1.5 to 2 inches and circumference of the cylindrical container 102 is about 2 inch, although other size of the cylindrical container 102 can be used without departing from the scope and spirit of the present invention.

According to another aspect of the present invention, the rim 118 extends up to 1 inch around the circumferential edge 116 of the cylindrical container 102.

According to another aspect of the present invention, the lid apertures 122a-c include a central flower-shaped aperture 122b-c and a concentric series of elongated openings 122a surrounding the flower-shaped aperture 122b-c.

According to another aspect of the present invention, the closed end 110 of the cylindrical container 102 includes a flower-shaped aperture 112a-b.

According to another aspect of the present invention, the cylindrical lid 120 detachably attaches in a perpendicular disposition in relation to the cylindrical sidewall 104, thereby allowing access to the cylindrical cavity 106 of the cylindrical container 102 to deposit, remove or manipulate the substrate inside the cylindrical cavity 106.

According to another aspect of the present invention, the sloped container 200 has a length of about 15 inches and a breadth of about 10 inches, a height of the first wall 206 is about 5 inches and a height of the sloped second wall 210 is about 2.5 inches.

According to another aspect of the present invention, the sloped container 200 is made of materials including metals and polymers.

According to another aspect of the present invention, the pair of lateral walls 108a-b of the sloped container 200 slope from the first wall 206 to the second wall 210 at approximately 3° angle and the curved lid 216 slopes at about 3° angle, thereby when the curved lid 216 is attached to the sloped container 200 the combination of both slopes forms a 6° gradient.

According to another aspect of the present invention, the predetermined gradient of the sloped plane surfaces 217 is sloped between about 3 to 27 degrees from the central horizontal plane surface 217a of the curved lid 216, thereby creating greater space for receiving multiple cylindrical containers 102.

According to another aspect of the present invention, the discharge of fluid from the at least one nozzle 224a, 224b can be programmed for a predetermined time at a regular interval or can be controlled remotely.

According to another aspect of the present invention, the at least one nozzle 224a, 224b may be operationally connected to at least one hole 205a, 205b on the tray, the first wall 206, the second wall 210 or at least one of the pair of lateral walls 208a, 208b to coordinate spraying fluid and nutrient to the vegetation.

According to another aspect of the present invention, the invention further comprises at least one external fluid pressure line connected to at least one of the holes 205a, 205b on the tray 202.

According to another aspect of the present invention, the cylindrical container 102 is configured to be placed in a three-dimensional vegetation growing system 400, 500 or 600.

According to another aspect of the present invention, the sloped container 200 is configured to be attached to a three-dimensional vegetation growing system 400, 500 or 600.

According to another aspect of the present invention, the system 100 and method 300 propagates vegetation growth under aeroponic conditions by the intermittent application to a substrate and roots through uniform exposure to moisture, lights, and nutrients.

According to another aspect of the present invention, the holes 222 on the curved lid 216 are circular to match the cylindrical shape of the sidewalls 104 of the cylindrical container 102, whereby the cylindrical containers 102 are force-fit into corresponding holes 222 on the curved lid 216 and allowing the rim 118 of the cylindrical container 102 to rest on the surface of the curved lid 216.

According to another aspect of the present invention, the predetermined gradient of the sloped plane surfaces 217b-e are sloped between about 3 to 27 degrees from the central horizontal plane surface 217a of the curved lid 216, thereby creating greater space for receiving multiple cylindrical containers 102.

Those skilled in the art will recognize that aeroponic growth is the process of growing plants in an air or mist environment without the use of soil or an aggregate medium. The only requirements for the vegetation are air, sunlight, nutrients, water, and a medium which the roots can grow into to support the plant. In operation, aeroponic growth is accomplished by suspending a plant's roots through a support medium into a closed environment wherein nutrients and other sustenance, e.g., a nutrient rich water solution, for the plant are sprayed or misted onto the dangling roots while the leaves and crown of the plant extend upwardly from the support-medium.

Often, Gordon® plug or other substrates are used to initiate growth of the vegetation. Further, the roots and fiber nutrients of such substrates require a framework to adhere to for guidance during growth. Also, moisture, nutrients, and light must be accessed from 360°. Furthermore, excess spraying or moisture buildup that forms in the growing environment of the substrate must be controlled.

As referenced in FIG. 1, a two-stage aeroponic growing system 100 comprises a cylindrical container 102, and a sloped container 200, wherein the first stage of growth of vegetation involves growth of the seedlings is conducted in the cylindrical container 102, wherein the cylindrical container 102 comprises at least one cylindrical cavity 106 containing a substrate that facilitate germination of the seedlings cylindrical container 102, whereas the second stage of growth of vegetation, coupling the cylindrical container 102 comprising the seedlings have grown tall on the limited volume substrate to the plurality of holes 222 on the curved lid 216 of the sloped container 200, offering a larger volume for continued growth and harvesting of the vegetation that is growth of the germinated of plants is conducted in the cylindrical container 102.

Figure 2:
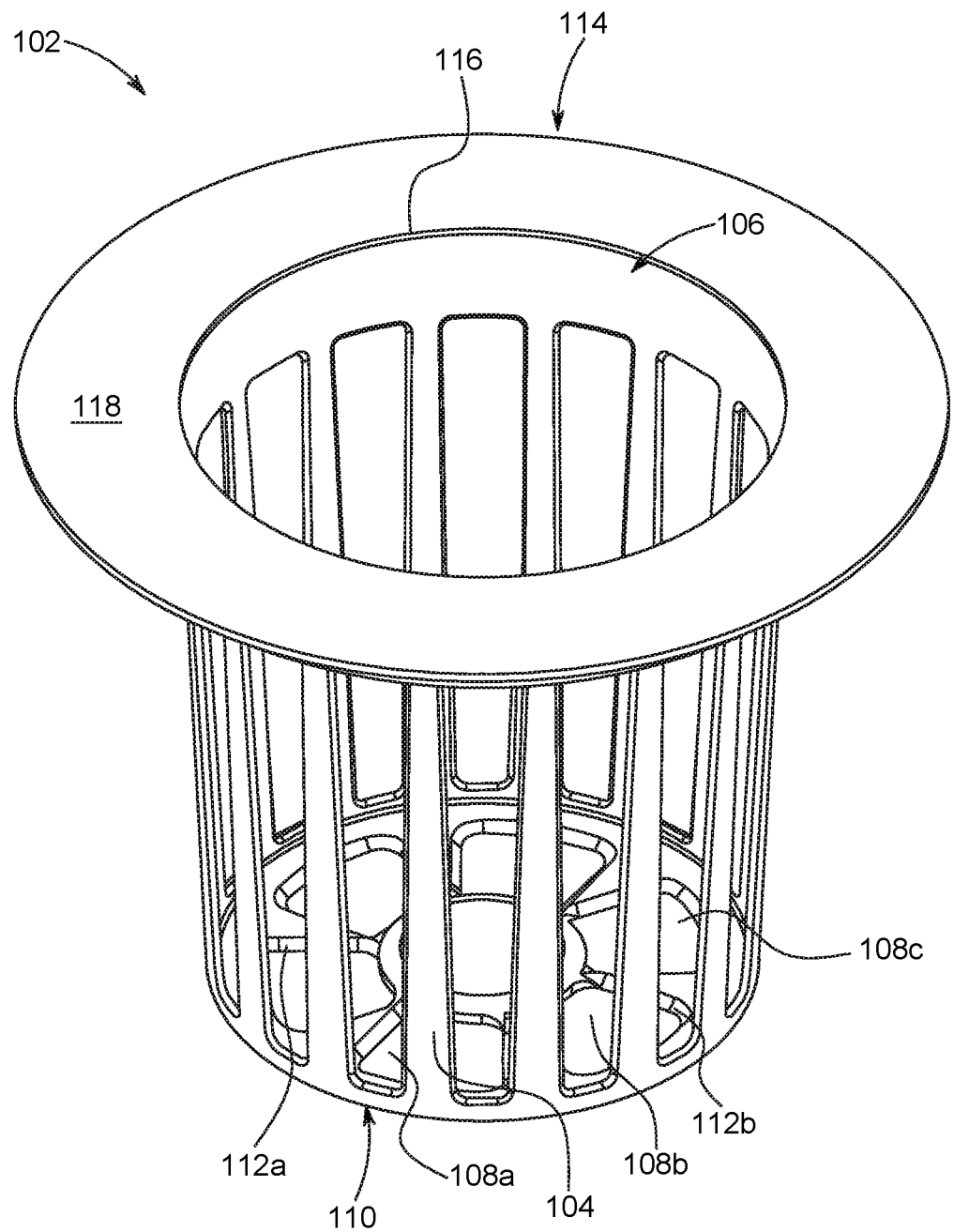
FIG. 2 illustrates a perspective view of an exemplary cylindrical container for a two-stage aeroponic growing system, in accordance with an embodiment of the present invention.

Turning now to FIG. 2, the cylindrical container 102 of system 100 is configured to contain a substrate having fibrous minerals, or roots, or both during a first stage of growth where the seedlings are initially growing. The cylindrical container 102 forms a restricted volume, such that the substrate fits snugly inside the cylindrical container 102. The cylindrical container 102 provides a surface for the roots and fibers of the substrate to engage, and also enables a 360° exposure to nutrients, liquids, and light. In one embodiment, the substrate is a Grodan® plug.

As referenced in FIG. 2, the cylindrical container 102 may be generally elongated to maximize surface area engagement with the substrate. The cylindrical container 102 comprises a continuous, generally cylindrical sidewall 104 defined by a plurality of spaced-apart, elongated side apertures 108a, 108b, 108c. The side apertures 108a, 108b, 108c enable passage of light and moisture, while also enabling passage of fibrous materials and roots. In one embodiment, the side apertures 108a, 108b, 108c extend along the length of the cylindrical sidewall 104. In one embodiment, the circumference of the cylindrical container 102 is about 2".

Looking at FIG. 2, the cylindrical container 102 further comprises an open end 114 terminating at a circumferential edge 116. A rim 118 extends around the circumferential edge 116 of the cylindrical container 102. In one embodiment, the rim 118 extends up to 1". A cylindrical lid 120 engages the circumferential edge 116 of the open end 114. The cylindrical lid 120 detachably attaches in a perpendicular disposition in relation to the cylindrical sidewall 104. The cylindrical lid 120 regulates access to the cylindrical cavity 106 of the cylindrical container 102. In this manner, the substrate may be deposited, removed, or manipulated inside the cylindrical cavity 106.

Figure 3:
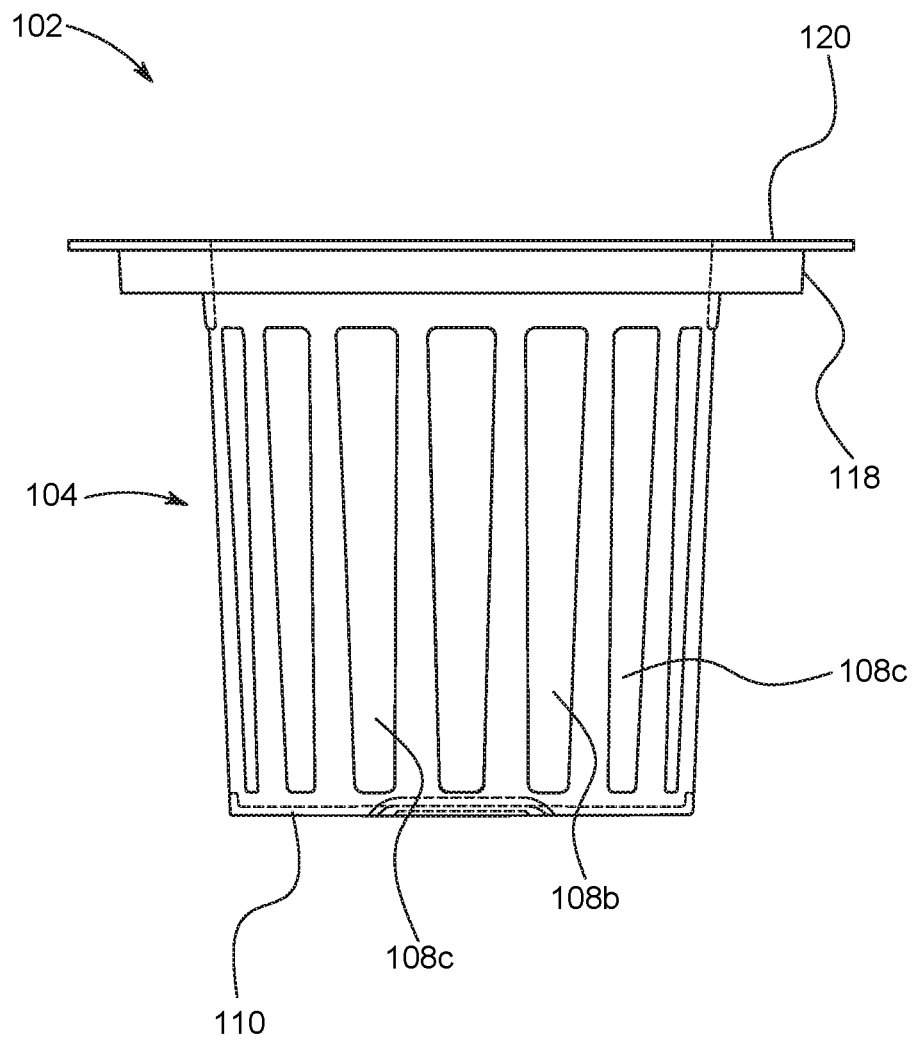
FIG. 3 illustrates an elevated side view of the cylindrical container for the two-stage aeroponic growing system shown, in accordance with an embodiment of the present invention.

As shown in FIG. 2 and FIG. 3, the cylindrical container 102 further comprises a closed end 110. The closed end 110 forms a fixed barrier that at least partially restricts growth of the vegetation. The closed end 110 is defined by a plurality of spaced-apart end apertures 112a, 112b. The end apertures 112a, 112b allow fibrous material and roots to extend and wrap around the edges of the end apertures 112a, 112b. The apertures 112a, 112b help create an environment efficacious for first stage growth. Further the side apertures 108a-c and the end apertures 112a-b allows sufficient exposure of the substrate and the seedlings to light, air, water and nutrients. Further the closed end 110 of the cylindrical container 102 includes a flower-shaped aperture 112a-b, although other shaped apertures can be used without departing from the scope and spirit of the present invention.

Figure 4A:
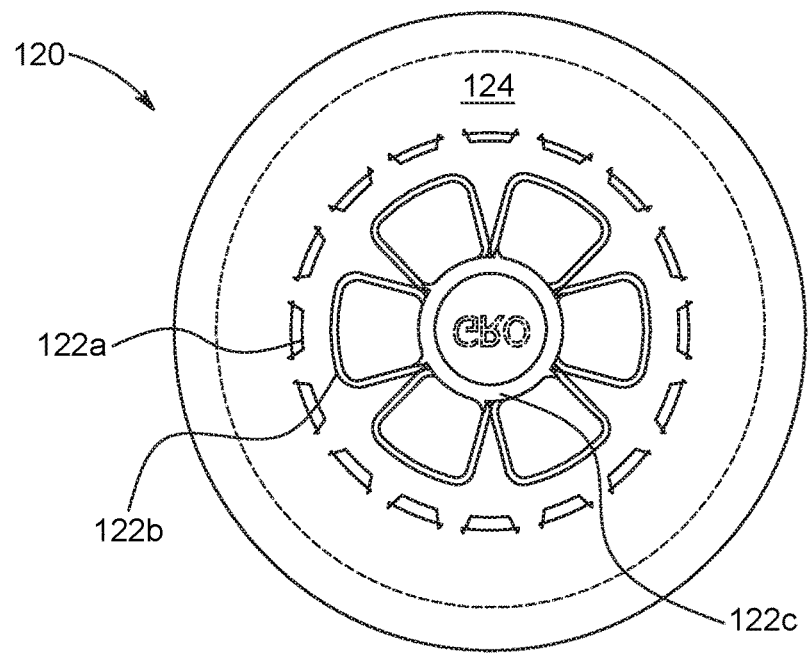
FIG. 4A illustrates a bottom view of a first face of a cylindrical lid for a cylindrical container, in accordance with an embodiment of the present invention.
Figure 4B:
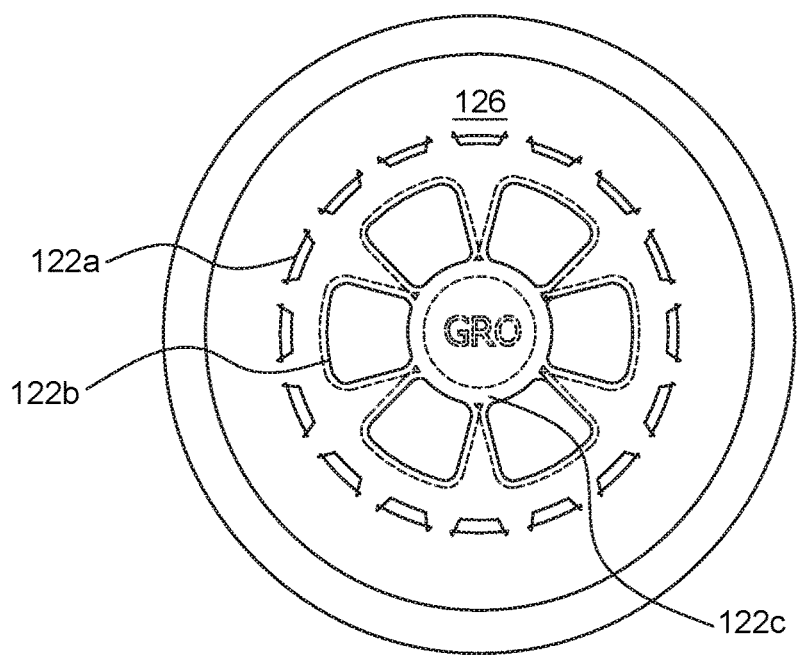
FIG. 4B illustrates a top view of a second face of an exemplary cylindrical lid for a cylindrical container, in accordance with an embodiment of the present invention.

As shown in FIG. 4A illustrating a bottom view of the cylindrical lid 120 and FIG. 4B illustrating a top view of the cylindrical lid 120, wherein the cylindrical lid 120 is defined by a first face 124 showing a bottom view of the cylindrical lid, a second face showing a top view of the cylindrical lid 126, and a plurality of lid apertures 122a, 122b, 122c. The lid apertures 122a, 122b, 122c enable passage of the fibrous material and roots from the substrate to extend and wrap around the edges of the end apertures 122a, 122b, 122c and the lid 120. In one embodiment, the lid apertures 122a, 122b, 122c include a central flower-shaped aperture and a concentric series of elongated openings surrounding the flower-shaped aperture. Though any combination, dimension, or shape may be used for the lid apertures 122a, 122b, 122c.

In one exemplary use of the cylindrical container 102, a pre-cut Grodan® plug, which is normally used to start a seed, can be placed into the cylindrical container 102 to continue rooting in the first stage of growth. The cylindrical container 102 provides just enough structure for the fibrous minerals and roots to grab onto, while also giving the vegetation quicker access to the aeroponic structure because the cylindrical container 102 is small.

As the seedlings are not very large and exhibit limited development of the rooting system, a substrate of restricted volume is preferred at the first stage. This makes it possible to increase the number of seedlings cultivated in a limited space. This also makes it possible to minimize the volume of nutritive solution necessary to maintain the substrate under suitable conditions for the development of seedlings.

The substrates used in the present invention include fibrous structure, and predominantly vertical disposition of the Grodan® plug, that creates a desired resilience. One practical advantage when using the Grodan® plug is that it retains its shape, makes good contact with the cylindrical container 102, and guarantees fast root growth. Further, an efficient balance between small and large pores in the stone wool of the Grodan® plug ensures an ideal air to water ratio in the Grodan® plug. The fibrous structure creates a balanced distribution of feed water throughout the entire Grodan® plug. In short, the homogeneity, flexibility, shape and firmness of the Grodan® plug creates the foundation for the optimum germination process and a uniform sowing result.

Figure 5:
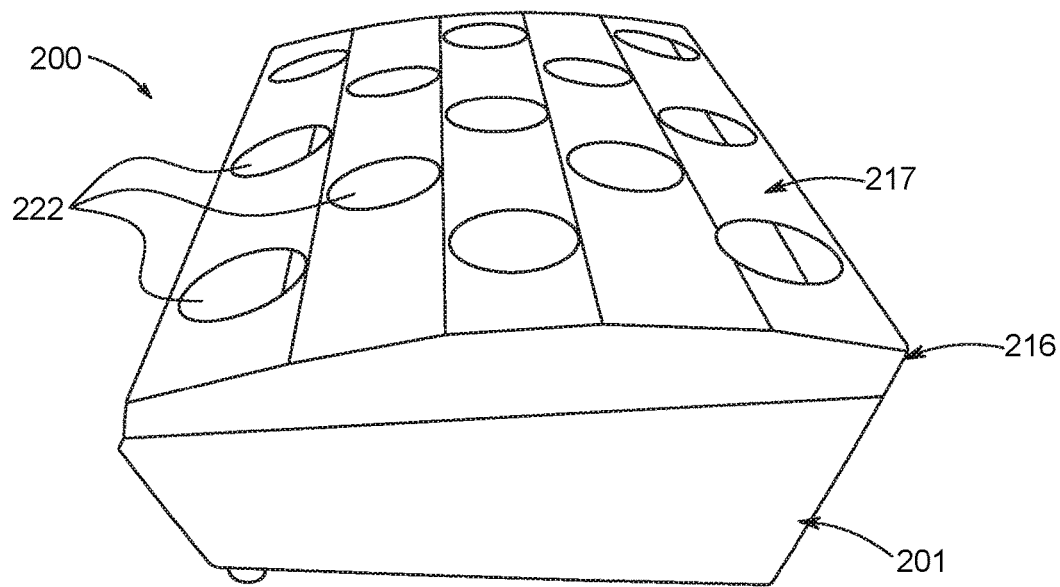
FIG. 5 illustrates a top perspective view of an exemplary sloped container, in accordance with an embodiment of the present invention.

Turning now to FIG. 5, the system 100 provides a sloped container 200 comprising a pot 201 and a curved lid 216 with plurality of holes 222 on its sloped surface 217, wherein the plurality of holes 222 receive the plurality of cylindrical containers 102 at a second stage of growth. The second stage commences when the seedlings have grown tall on the limited volume substrate for a predetermined duration. Once coupled to the cylindrical container 102, the sloped container 200 provides a second stage of growth. In the second stage, the seedlings which have grown tall on these limited volume of the cylindrical container 102, along with the substrate, is operationally coupled to the sloped container 200; thereby offering a larger volume, where the individual substrates are spaced-apart.

In this second stage, the sloped container 200 and the coupled cylindrical container 102 work to seal the substrate and the cylindrical container 102, control the moisture environment of the substrate, optimize spacing of multiple cylindrical containers 102, so as to maximize growth, and meet federal guidelines for plant containers.

In one operational embodiment, a plurality of cylindrical containers 102 couple to the sloped container 200 to create a sealed moisture environment that regulates spraying, draining, and spacing of the vegetation. The sloped disposition of the sloped container 200 allows greater spacing so that maximum amount of cylindrical containers 102 can be coupled to the sloped container 200.

Figure 6:
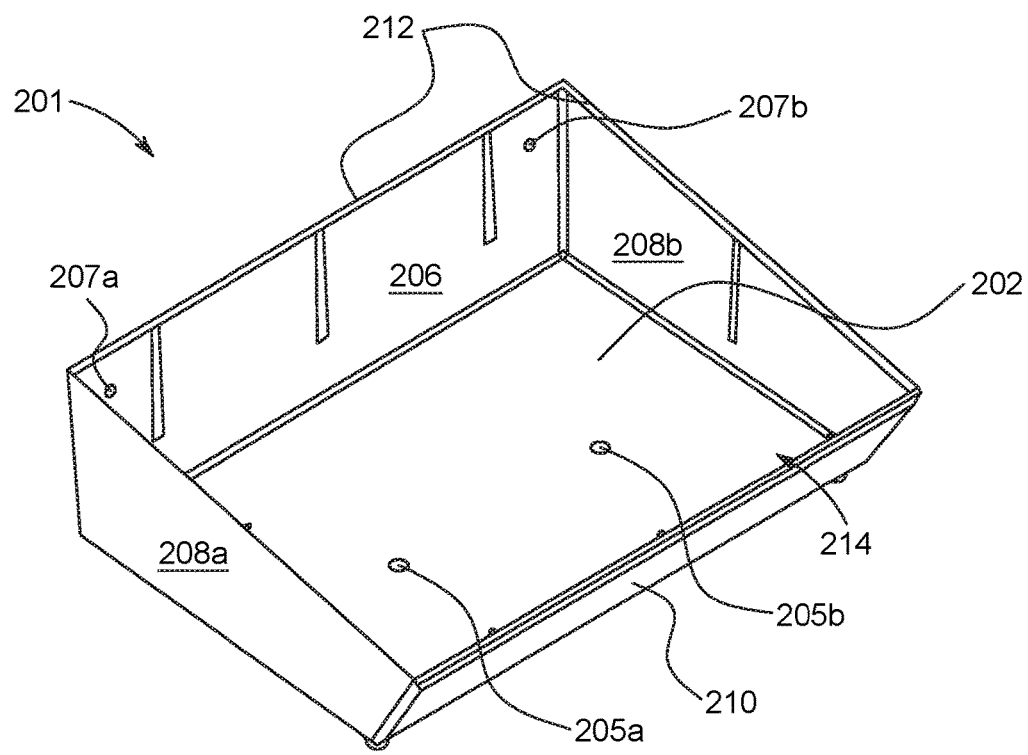
FIG. 6 illustrates a top perspective view of an exemplary tray for an exemplary sloped container, in accordance with an embodiment of the present invention.

As referenced in FIG. 6, the sloped container 200 comprises a tray 202 that forms a base for the pot 201 of the sloped container 200. The tray 202 is surrounded by a first wall 206, a pair of lateral walls 208*a*, 208*b* and a generally sloped second wall 210. The sloped second wall 210 may be shorter than the first wall 206. The pair of lateral walls 208*a*, 208*b* slope from the first wall 206 to the second wall 210 at approximately 3° angle. In one embodiment, the walls have an upper free edge 212. The tray 202 and the walls form a cavity that can receive at least a portion of the cylindrical container 102 and the substrate contained therein. The tray 202 is easily accessible to clean the walls between growing. Further, the tray 202 is generally flat and forms at least one supply holes 205*a* or 205*b* for supplying fluid and nutrients to the vegetation. Further one or more additional supply holes 207*a* or 207*b* on the walls 206, 208*a-b* or 210 of the pot 201 can be provided for uniform distribution of the fluid and nutrients to the vegetation.

In one embodiment, the tray 202 is U.S. Department of Agriculture (USDA) approved and fabricated from food safe materials. In one embodiment, the tray 202 has dimensions of about 15 inches long and about a 10.5 inch breadth. Suitable materials may include single injected molded polymers.

Figure 7A:
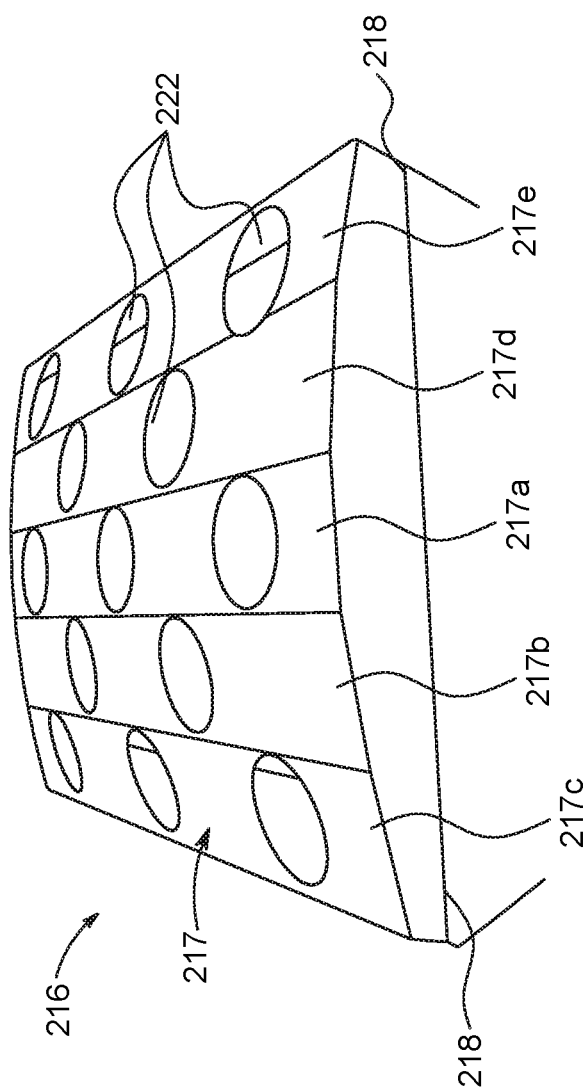
FIG. 7A illustrates a top perspective view of an exemplary curved lid for a sloped container, in accordance with an embodiment of the present invention.
Figure 7B:
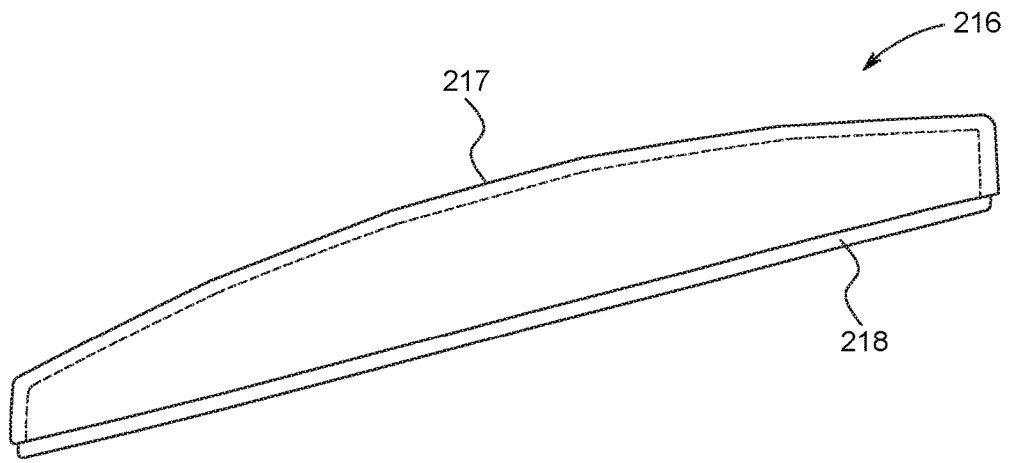
FIG. 7B illustrates an elevated side view of an exemplary curved lid for a sloped container, in accordance with an embodiment of the present invention.
Figure 7C:
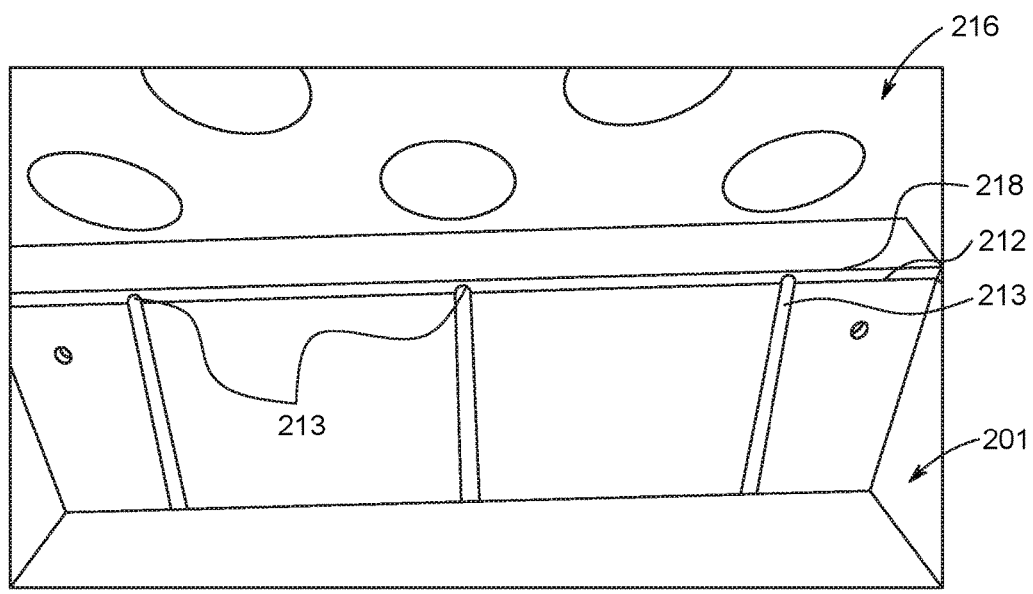
FIG. 7C illustrates attachment of an exemplary curved lid with the upper edge of the pot for a sloped container, in accordance with an embodiment of the present invention.

As illustrated in FIG. 7A showing a top perspective view of a curved lid 216 of the sloped container 200. The curved lid 216 having a sloped surface 217 and a circumferential edge 218 configured to detachably attach to the upper free edge 212 of the walls 206, 208*a-b*, 210 of the pot 201 of the sloped container 200 as shown in FIG. 7B and FIG. 7C. A seal may be used to interface the upper free edges 212 and the perimeter of the curved lid 216. The seal inhibits loss of moisture form the sloped container 200. As shown in FIG. 7C, the pot 201 of the sloped container 200 further comprises a plurality of protrusions 213 to lock the circumferential edge 218 of the curved lid 216 to the upper free edge 212 of the pot 201. Further as shown in FIG. 7A, the sloped surface 217 of the curved lid comprises a central horizontal plane surface 217*a* and plurality of gradually sloped plane surfaces 217*b-e* from both sides of the central horizontal plane surface 217*a*, whereby each of the gradually sloped plane surfaces 217*b-e* are at a predetermined gradient from the adjacent plane surface, further each of the plane surface 217*a-e* comprises a plurality of rows of evenly, spaced-apart holes 222 that are configured to enable holding at least one cylindrical container 102, whereby the rim 118 engages the curved lid 216 allowing the at least one cylindrical container 102 fixedly couples to the sloped container 200 at a predetermined angle.

Because of the difference in height between the first wall 206 and the second wall 210, the curved lid 216 falls at a slope. In addition to this slope, the curved lid 216 is defined by a gradient curvature 218 sloped between 3° to 27° from a horizontal plane that lies coplanar with the tray 202. As discussed above, one embodiment of the system 100 includes the pair of lateral walls 208*a*, 208*b* sloping from the first wall 206 to the second wall 210 at approximately 3° angle. Further, the curved lid 216 slopes at about 3°. The combination of both slopes forms a 6° gradient. Further, inclination of the vegetation allows more uniform light distribution as well as a more uniform spray of liquid nutrients while accommodating a larger number of plants and/or offering a larger volume for the continued growth of the vegetation, and also enabling more efficient harvesting of the vegetation.

Figure 8:
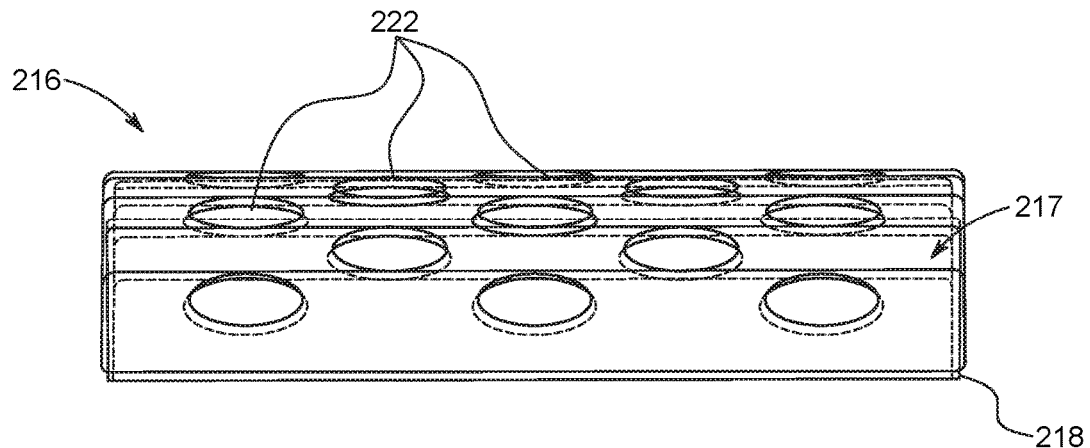
FIG. 8 illustrates a frontal view of a curved lid for the sloped container, in accordance with an embodiment of the present invention.

FIG. 8 illustrating a front perspective view of the curved lid 216 showing a plurality of evenly spaced-apart holes 222 that follow the contour of the curved lid 216. The holes 222 are sized and dimensioned to enable passage of the cylindrical container 102. The curved angle creates greater space for receiving multiple cylindrical containers 102. In one embodiment, multiple cylindrical containers 102 are force-fit into corresponding holes 222 that form in the curved lid 216.

Figure 9:
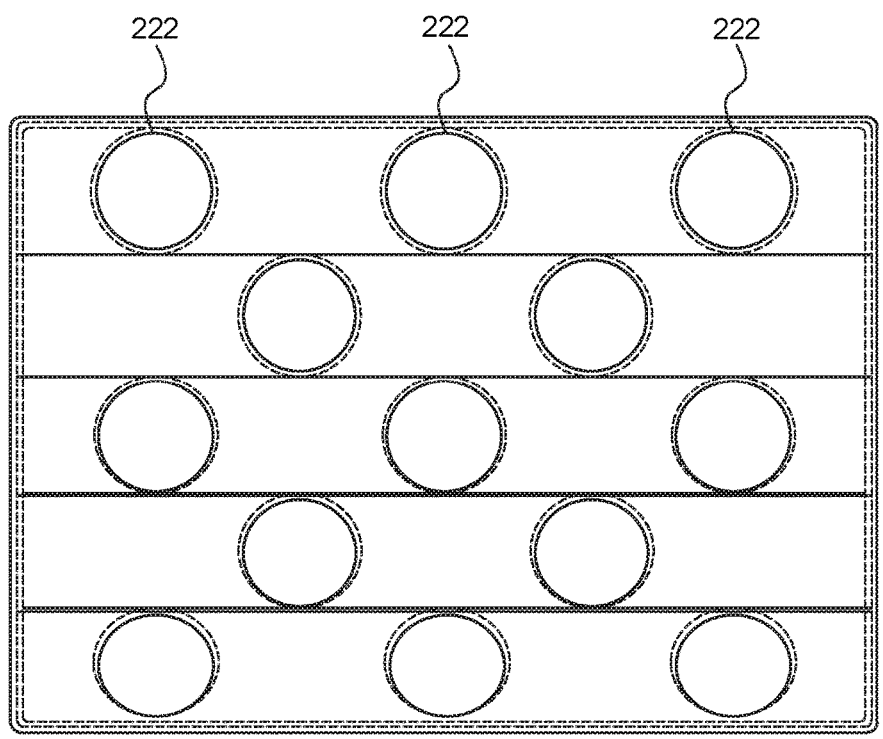
FIG. 9 illustrates a top view of a curved lid for the sloped container, in accordance with an embodiment of the present invention.

As illustrated in FIG. 7A and FIG. 9, the holes 222 are circular to match the cylindrical shape of the sidewalls 104 of the cylindrical container 102. The holes 222 form a snug fit around the sidewalls so that the cylindrical container 102 remains fixedly coupled to the sloped container 200 at an angle. The rim 118 on the open end 114 of the cylindrical container 102 rests against the surface of the curved lid 216. The rim 118 rests flat on the respective plane surfaces 117*a-e* and fits into the hole snugly with the rim 118 resting flat on the respective plane surfaces 117*a-e* of the curved lid 216 of the sloped container 200, thereby creating a sealed moisture environment within the cavity 214 that regulates spraying, draining, and spacing of the vegetation. This snug relationship prevents water from the cavity in the sloped container 200 from escaping into the air above, which would wet the stock of the vegetation. With traditional aeroponic closed containers, over spray causes excessive wetting of the stock resulting in stem-rot issues and open containers allow loss of moistures to the atmosphere. Similarly as all the plants in the traditional containers are in same plane, there is an issues with the lighting as well.

Figure 10:
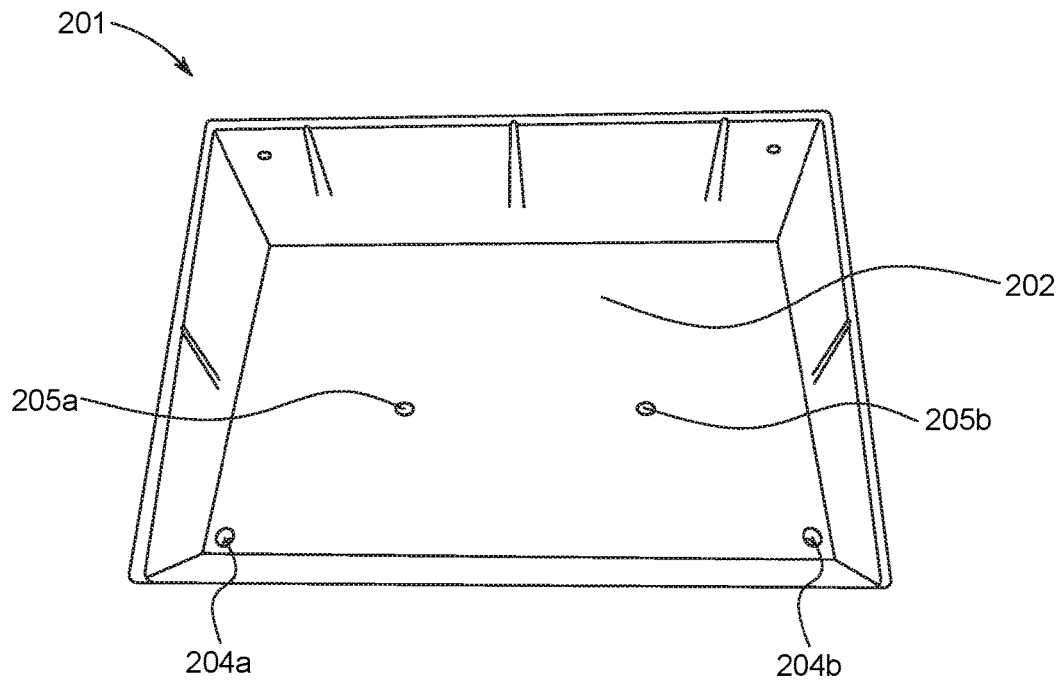
FIG. 10 illustrates a top perspective view of the pot of the sloped container showing drain holes and supply holes, in accordance with an embodiment of the present invention.

As illustrated in FIG. 10, the top view of the pot 201 of the sloped container 200, wherein the tray 202 of the pot 201 of the sloped container 200 having one or more drain holes 204*a*, 204*b* for releasing excess moisture. When fluid and nutrients are supplied to the individual cylindrical containers 102 that are mounted inclined at a predetermined angle to the curved lid 216 of the sloped container 200, thereby facilitates slow and sustained gravity return feed of the nutrient unused solutions back to the reservoir thus draining the excessive fluid out of the stock or substrate of the cylindrical containers 102 and controlling the amount of water engaging the vegetation while maximizing nutrient absorption.

Figure 11:
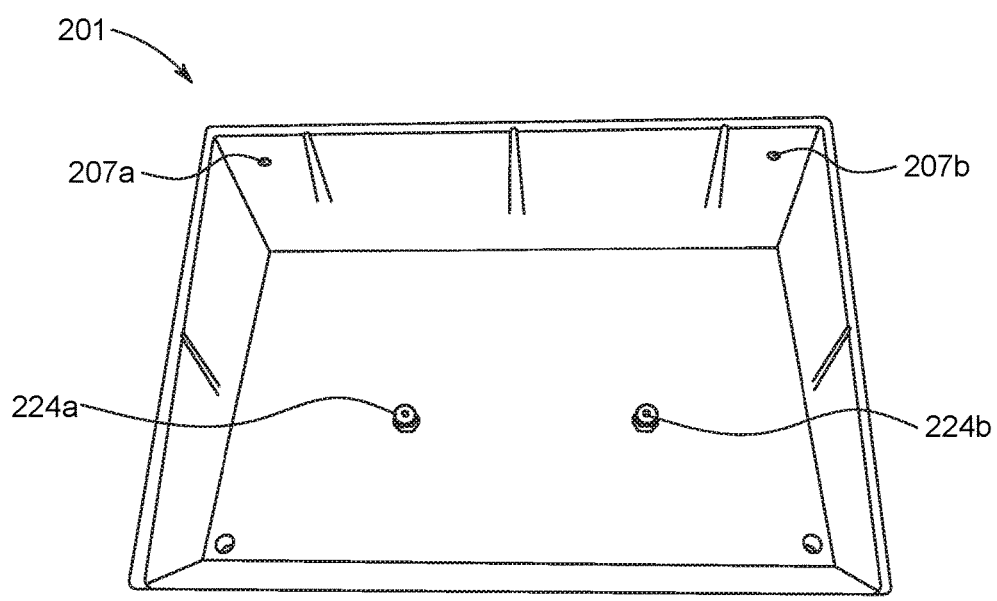
FIG. 11 illustrates a top perspective view of the pot of the sloped container showing nozzles attached to the supply holes, in accordance with an embodiment of the present invention.

Turning to FIG. 11, at least one nozzle 224*a*, 224*b* is operationally connected to the supply holes 205*a*, 205*b* (as shown in FIG. 10) of sloped tray 202 for spraying fluids and nutrients onto the vegetation. The nozzle 224*a*, 224*b* is configured to spray a fluid into the cavity of the sloped container 200 to provide moisture in the cavity, and through the various apertures of the cylindrical container 102 to wet the substrate and vegetation. In another exemplary embodiment, one or more nozzles can be mounted on the walls 206, 208a-b, 210 to spray fluid and nutrients into the cavity 214 of the sloped container 200. According to an exemplary embodiment of the present invention, a pair of supply holes 207a, 207b is shown on the first wall 206 of the tray 202 to mount the nozzles 224a, 224b.

Figure 12:
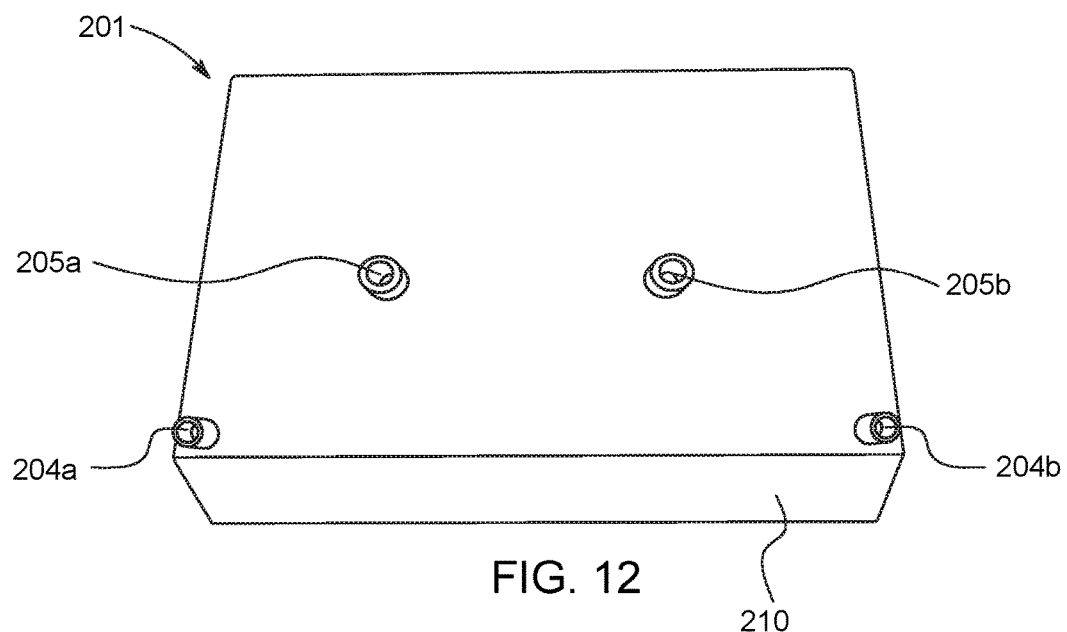
FIG. 12 illustrates a bottom perspective view of the pot of the sloped container, in accordance with an embodiment of the present invention.

As illustrated in FIG. 12, the bottom perspective view of the pot 201 of the sloped container 200 illustrates the position of the drain holes 204a, 204b towards the sloped second wall 210 of the container 200 at the lowest sloped region of the tray 202, thereby allowing complete drainage of the unused fluids and nutrients to the reservoir (not shown). Further FIG. 12 illustrates in an exemplary embodiment, the position of the supply holes 205a, 205b are positioned perpendicular to the tray 202 at the center of the tray 202.

Figure 13:
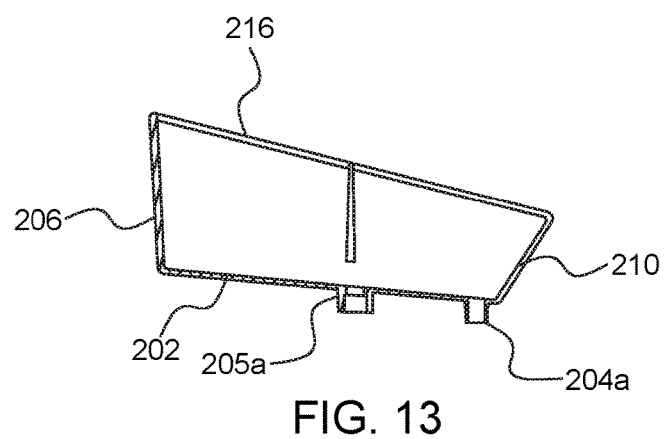
FIG. 13 illustrates a sectioned side view of the pot of the sloped container, in accordance with an embodiment of the present invention.

As FIG. 13 illustrates a sectioned side view of the pot of the sloped container showing the drain holes 204a, 204b positioned perpendicular to the tray 202 to optimize draining. In this manner, the vegetation is not exposed to excessive moisture. Further FIG. 13 illustrates gradient of the curved lid 216 with respect to the horizontal plane and the gradient of the second sloped surface with respect to the vertical plane according to an exemplary embodiment of the present invention.

Figure 14:
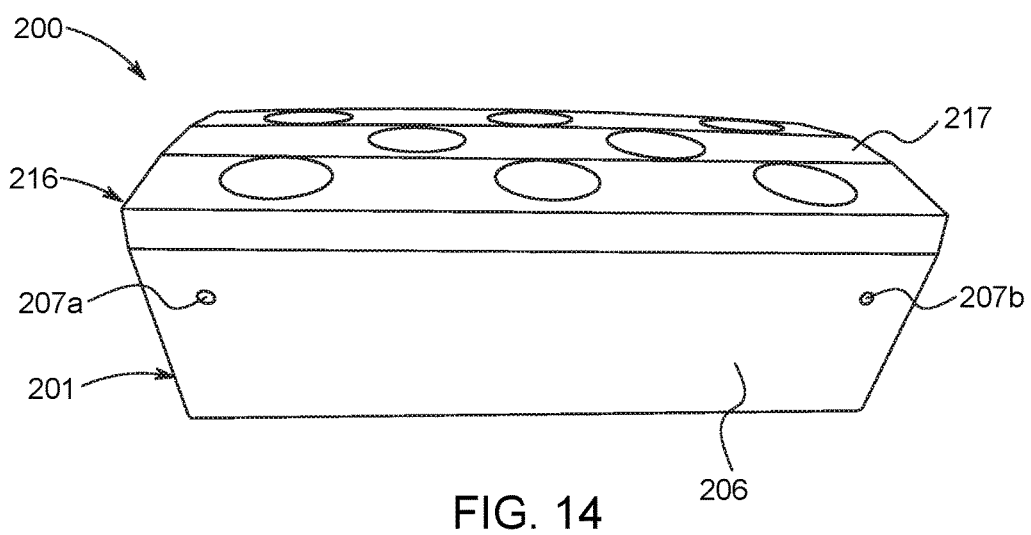
FIG. 14 illustrates back perspective view of the sloped container showing alternate supply holes, in accordance with an embodiment of the present invention.

As illustrated in FIG. 14, the rear perspective view of the sloped container 200 shows alternate supply holes 207a, 207b for mounting nozzles 224a, 224b to the first wall 206 of the pot 201 of the sloped container 200. The rear perspective view also illustrates the sloped container 200 height at which the supply holes 207a, 207b are positioned on the wall 206. Further it illustrates the gradient of the sloped surface 217 of the curved lid 216 with respect to the pot 201 of the sloped container 200.

Figure 15:
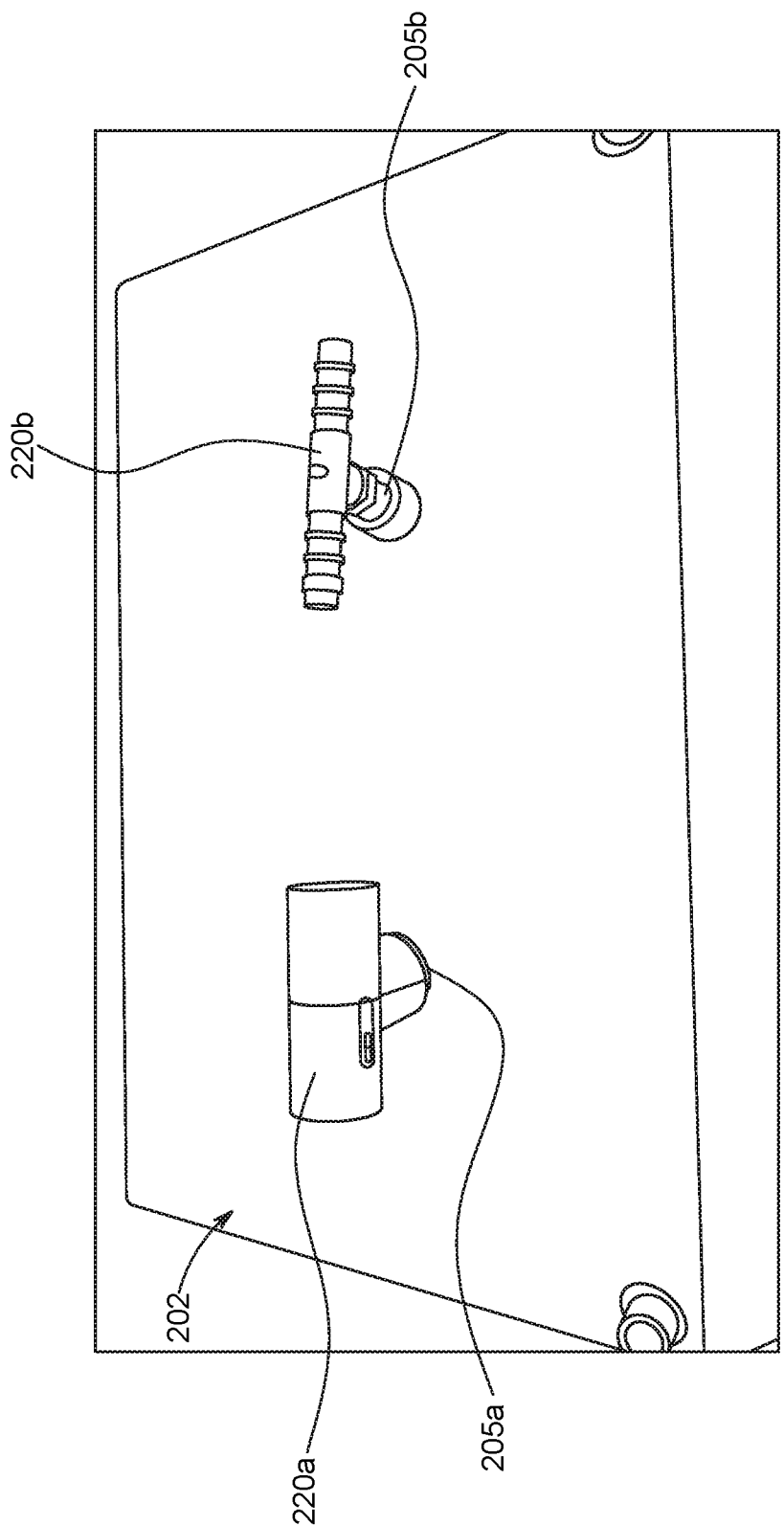
FIG. 15 illustrates a bottom perspective view of the pot of the sloped container comprising one or more gate attached to the supply holes, in accordance with an embodiment of the present invention.

In some embodiments, as illustrated in FIG. 15 the nozzle 224a, 224b is operationally connected to one or more fluid sources/reservoirs (not shown) through one or more gates 220a, 220b on the hole 205a, 205b to coordinate spraying fluid and nutrient to the vegetation. In an exemplary embodiment, a ⅛" internally threaded nipple/tap 220a enables facilitated threaded connection with the nozzle. A ¼" external threaded NPT 220b enables attachment to an external fluid pressure line. Though the pressurized line may be PVC to attach to various types of tubes and nozzles known in the art. Further the discharge of fluid from the nozzle 224a, 224b can be controlled remotely, so as to prevent over spraying.

Figure 16:
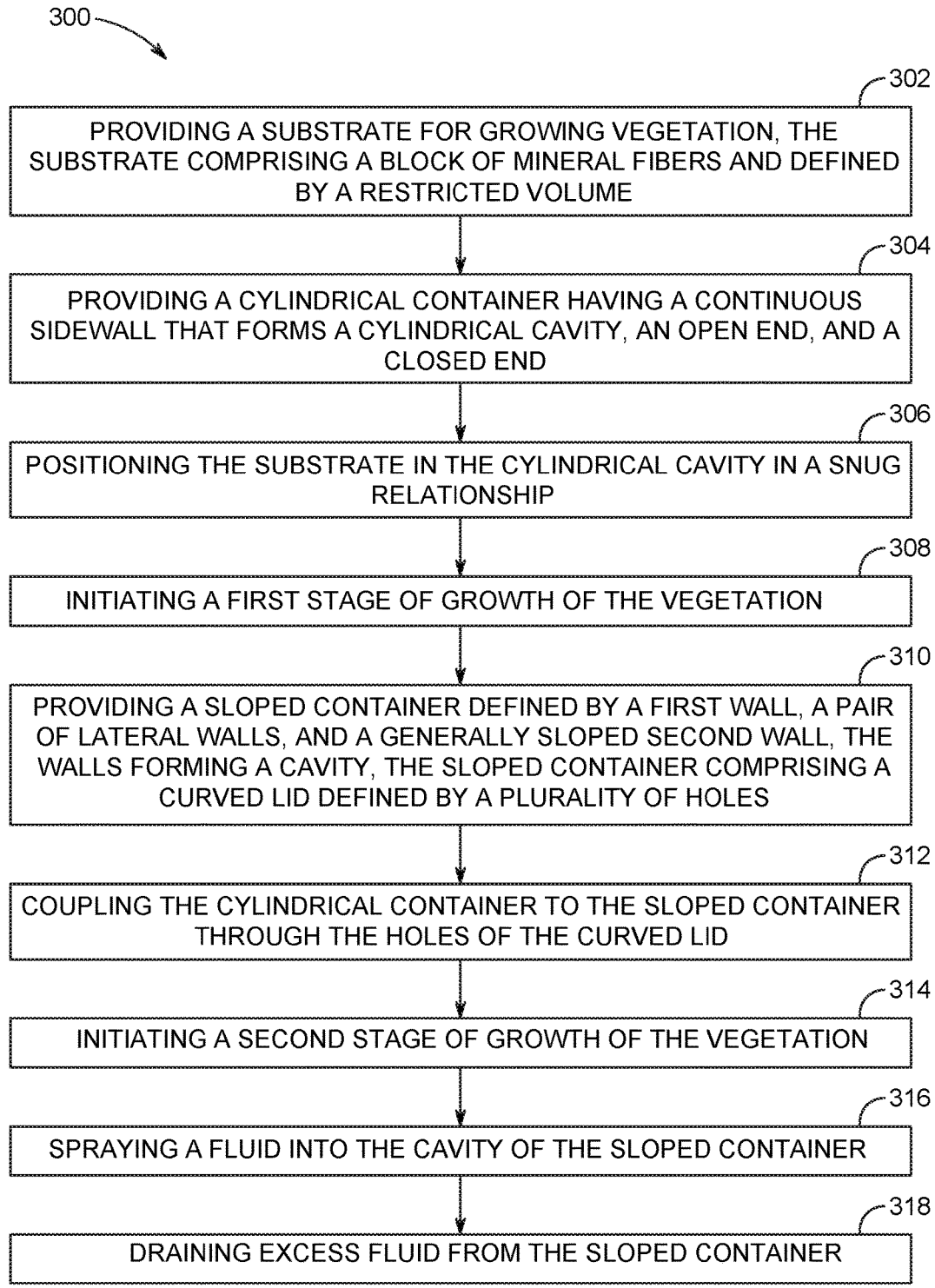
FIG. 16 illustrates a flowchart of an exemplary method 300 for aeroponic growing of vegetation in two stages, in accordance with an embodiment of the present invention.

FIG. 16 illustrates a flowchart of an exemplary method 300 for aeroponic growing of vegetation in two stages. The method 300 may include an initial Step 302 of providing a substrate for growing vegetation, the substrate comprising a block of mineral fibers and defined by a restricted volume. A Step 304 comprises providing a cylindrical container 102 having a continuous cylindrical sidewall 104 that forms a cylindrical cavity 106, an open end 114, and a closed end 110. A Step 306 may include positioning the substrate in the cylindrical cavity 106 in a snug relationship.

The method 300 further comprises a Step 308 of initiating a first stage of growth of the vegetation. Another Step 310 includes providing a sloped container 200 defined by a first wall 206, a pair of lateral walls 208a, 208b, and a generally sloped second wall 210, the walls forming a cavity, the sloped container 200 comprising a curved lid 216 defined by a plurality of holes 222. A Step 312 includes coupling the cylindrical container 102 to the sloped container 200 through the holes 222 of the curved lid 216. A Step 314 may include initiating a second stage of growth of the vegetation. A Step 316 includes spraying a fluid into the cavity of the sloped container 200. A Step 318 comprises draining excess fluid from the sloped container 200.

Figure 17:
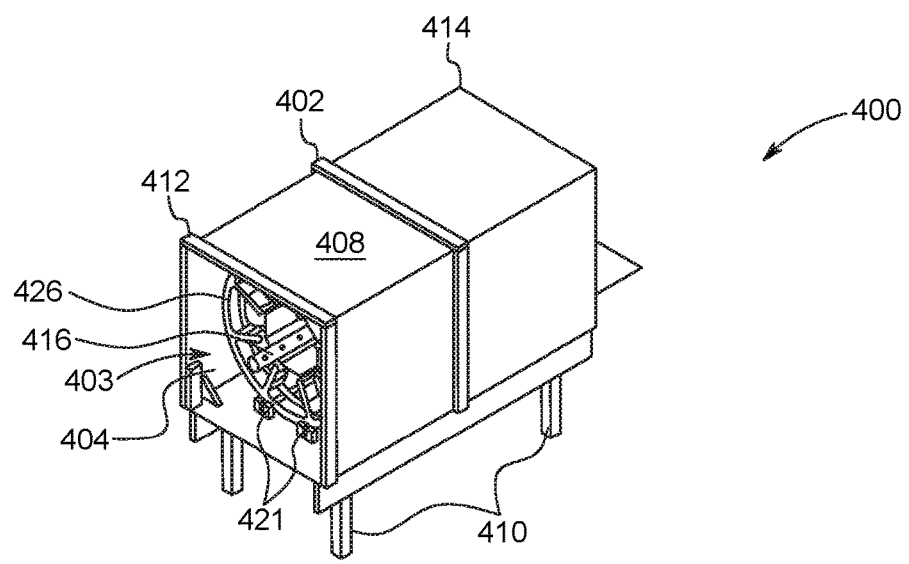
FIG. 17 illustrates a detailed top perspective view of an exemplary three-dimensional vegetation growing system 400.

In an exemplary embodiment of the present invention as shown in FIG. 17 is a detailed upper angle perspective view of an exemplary three-dimensional vegetation growing system 400. The system 400 includes a substantially rigid, rectangular shape housing 402 comprising an outer housing surface 408 which may be at least partially insulated to protect the enclosed hydroponic environment 403 against excessive heat. The housing 402 may further include inner housing surfaces 404. At least one light source comprising at least one illumination portion 406 may be provided on the inner housing surfaces 404. The illumination portion 406 may be oriented to emit the light at an optimal direction and intensity onto the vegetation.

Figure 18:
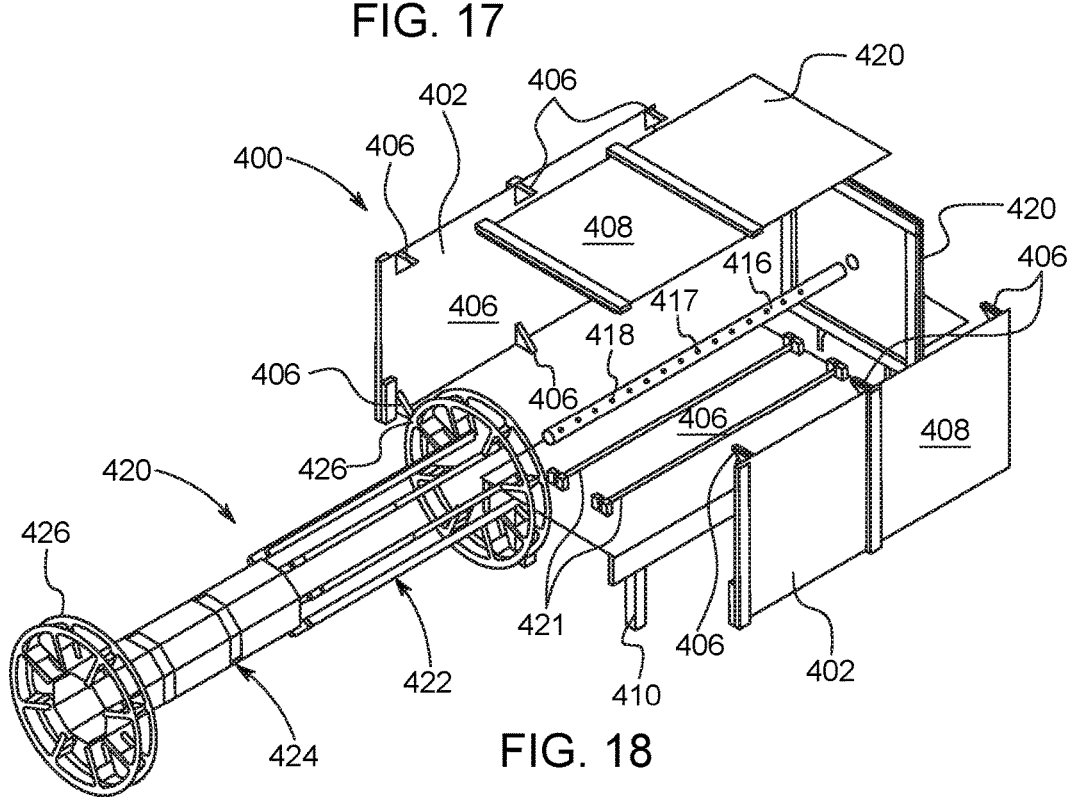
FIG. 18 illustrates an exploded perspective view of the exemplary three-dimensional vegetation growing system 400.
Figure 20:
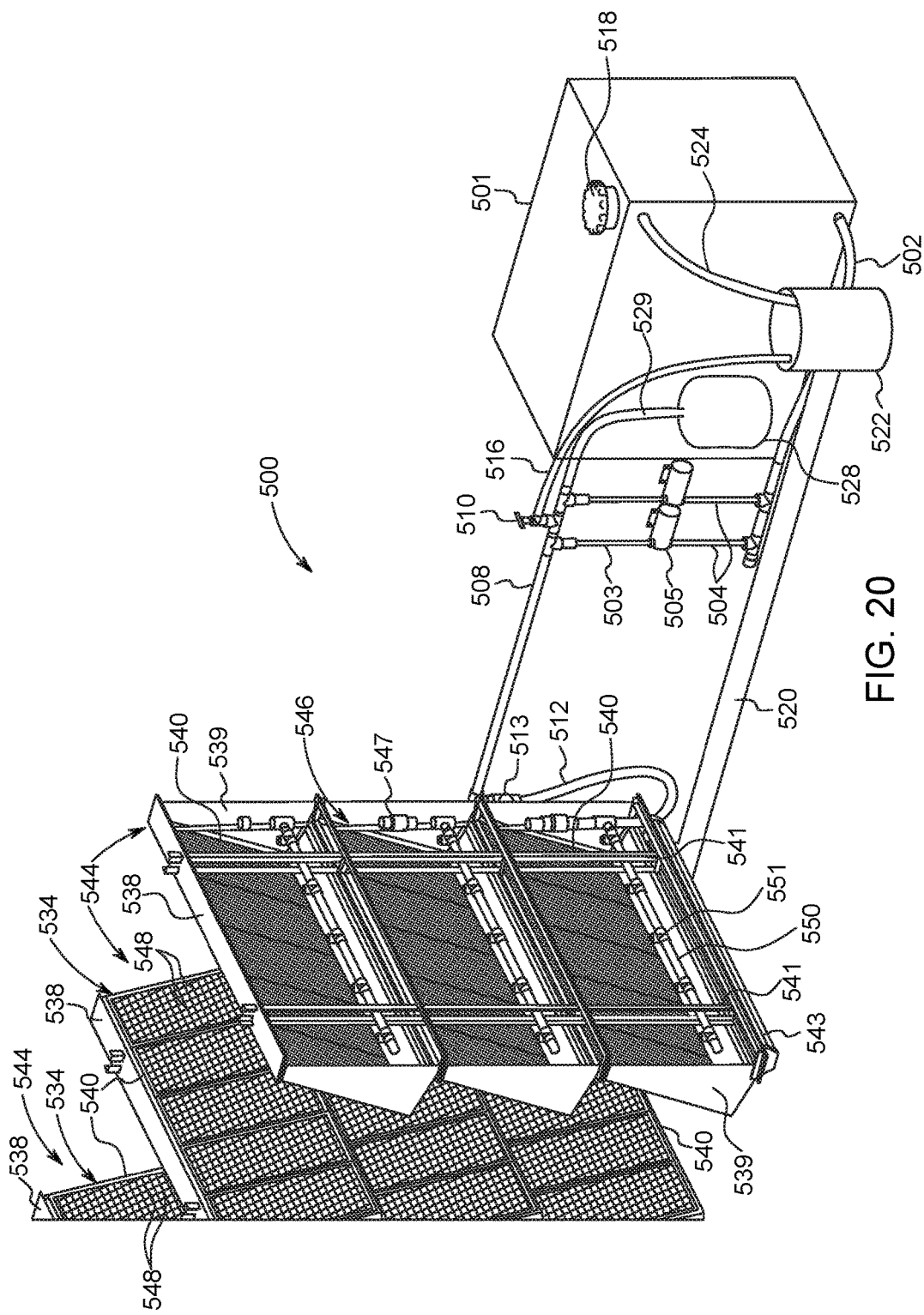
FIG. 20 illustrates a perspective view of an alternative illustrative embodiment of the three-dimensional vegetation growing systems 500 showing the arrangement of trays assemblies and vegetation growth sustaining liquid distribution mechanism, with at least a pair of vegetation growing towers of the system.
Figure 21:
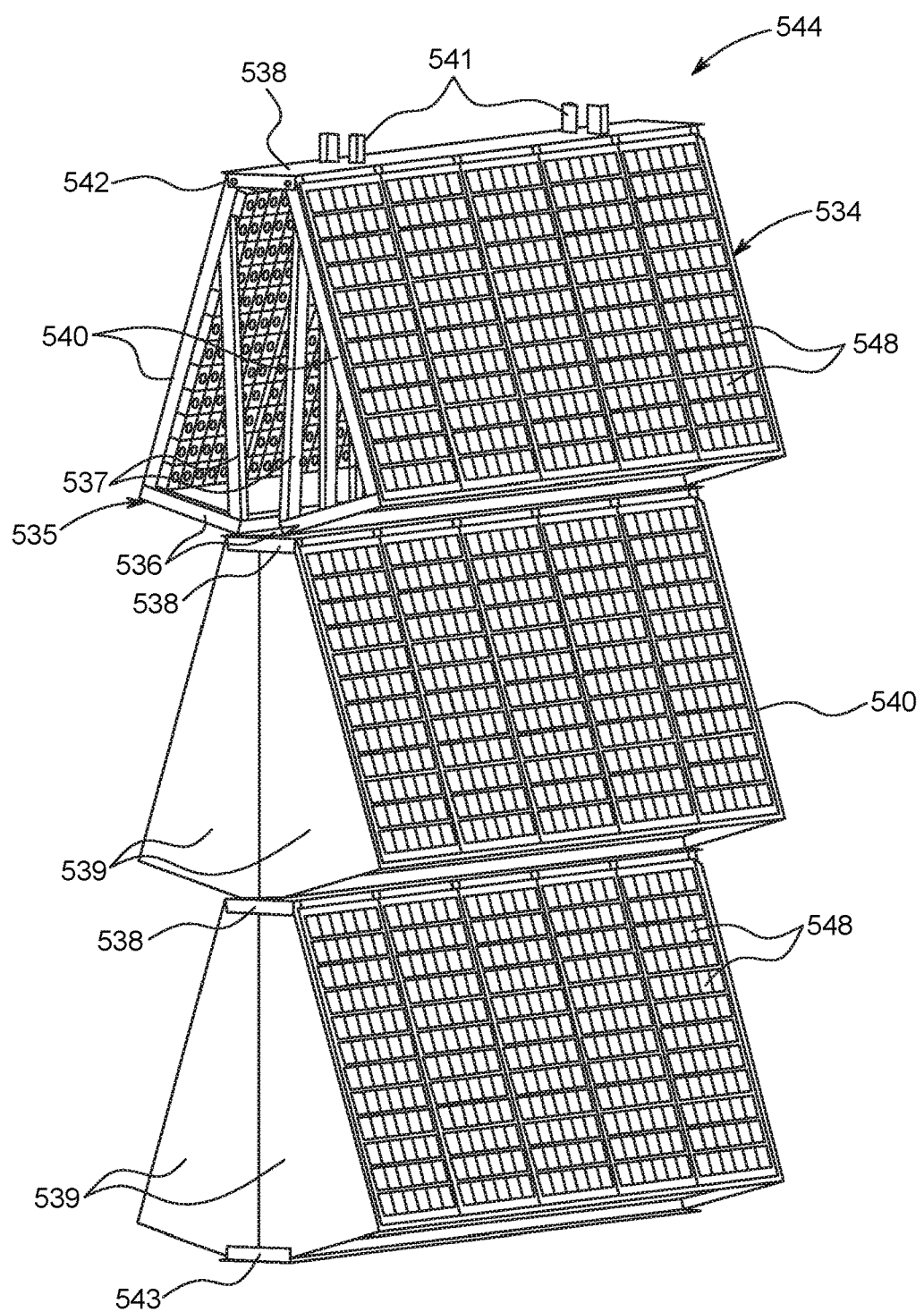
FIG. 21 illustrates a perspective view of an exemplary vegetation growing tower of the illustrative three-dimensional vegetation growing system 500.

FIG. 18 is an exploded perspective view of the exemplary three-dimensional vegetation growing system 400 showing a distribution portion 416 may be provided in the system housing 402 for uniform distribution of the vegetation growth sustaining liquid onto the vegetation as a fine spray or mist 436 (FIG. 20). The distribution portion 416 may include a distribution conduit 417 that extends from a first housing end 412 to a second housing end 414 of the system housing 402. Surplus portions of the vegetation growth sustaining liquid may be collected from the vegetation and recycled for reuse.

Further FIG. 18 illustrates, at least one conveyor device 420 provided in the system housing 402 to carry the vegetation along a generally helical or spiral travel path, thereby the conveyor device 420 may support the vegetation for transport during growth from germination to fully-grown vegetation which is ready for harvesting. The conveyor device 420 includes a generally elongated inner conveyor section 422. A generally elongated outer conveyor section 424 that extends from the inner conveyor section 422. At least one conveyor drive system 426 drivingly engage with the respective inner conveyor section 422 and outer conveyor section 424 of the conveyor device 420. Further, a growth medium (not illustrated) may be provided in the inner conveyor section 422 of the conveyor device 420. The vegetation remains anchored into the conveyor device 420, typically rotating in the helical path formed by the conveyor device 420 from the first housing end 412 to the second housing end 414 of the system housing 402 as the vegetation grows outwardly and extends from the inner conveyor section 422 into the outer conveyor section 424. The conveyor device 420 may be aligned through the system housing 402 in series, parallel or combinations thereof. A conveyor device support frame 421 is provided in the system housing 402 to support the conveyor device 420 in the system housing 402. Further, at least one selectively detachable housing support portion 410 may elevate and support the system housing 402 and the internal components, including the conveyor device 420, of the system 400. The housing support portion 410 may include legs that retractably or hingedly extend from each corner of the outer housing surface 408.

Figure 19:
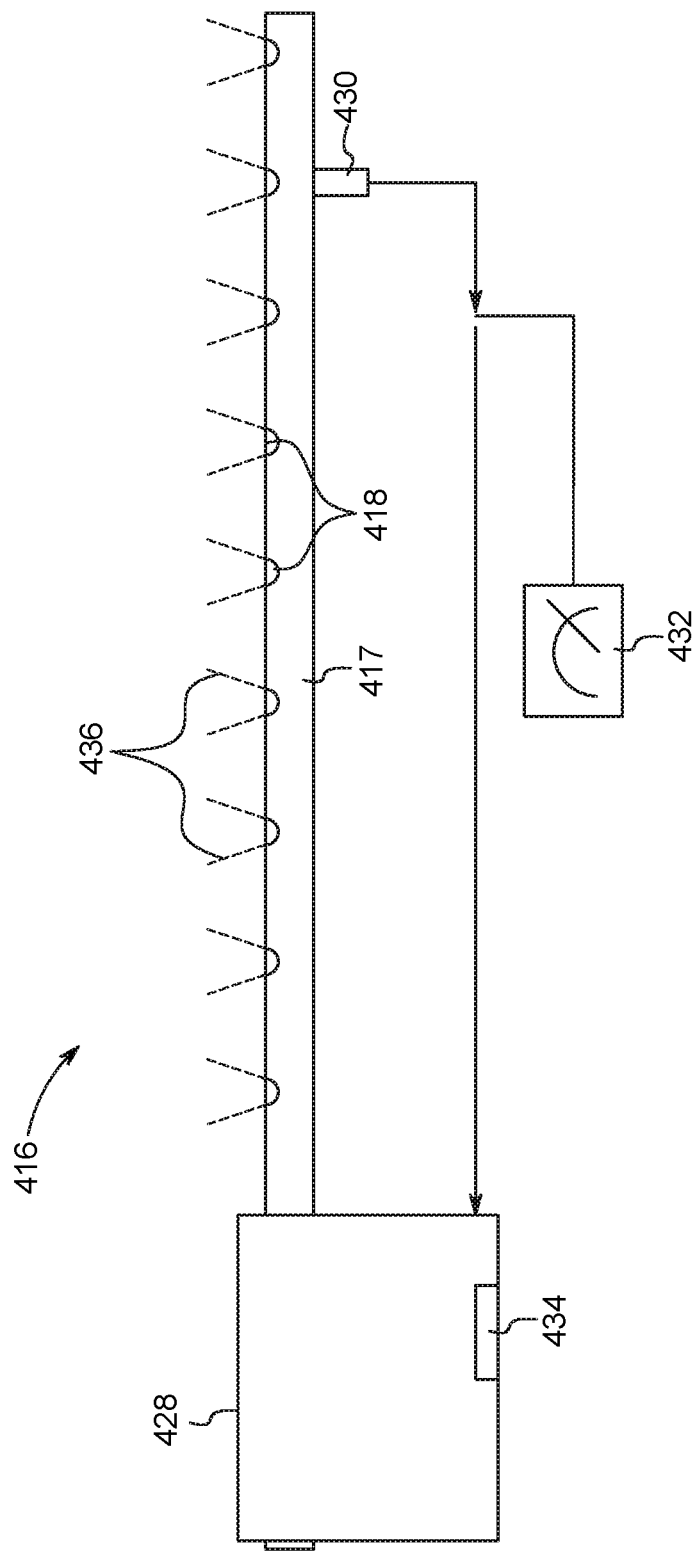
FIG. 19 illustrates a partially schematic side view of an exemplary distribution portion of the three-dimensional vegetation growing system 400.

FIG. 19 is a partially schematic side view of an exemplary distribution portion 416 of the three-dimensional vegetation growing system 400. The distribution portion 416 may be stationary or rotatable along an axis while the vegetation is rotated on the conveyor device 420 (FIG. 18). A vegetation growth sustaining liquid may be introduced into the distribution portion 416 through an inlet (not shown). The distribution portion 416 further includes an atomizer 428 which converts the vegetation growth sustaining liquid into a fine spray 436 such as a fog, mist or cloud. A fan 434 provided in the atomizer 428 forces the fine spray 136 through the distribution portion 416. A meter 432 positioned along the distribution portion 416 to monitor the pressure of the vegetation growth sustaining liquid as it flows from the atomizer 428. The atomizer 428 may include a pressure differential that forces the vegetation growth sustaining liquid through an atomizer nozzle (not shown) and onto the vegetation on the conveyor device 420. The atomizer 428 may include a piezoelectric atomizer. Further, the distribution portion 416 may include a distribution conduit 417 which is configured to discharge the vegetation growth sustaining liquid as a fine spray 436 onto the vegetation through at least one aperture 418. In some embodiments, a return conduit 430 collects and distributes excess or surplus portions of the vegetation growth sustaining liquid back to the atomizer 428 for recycling and reuse.

Further according to another exemplary embodiment of the present invention the system 400 allows two stage growth of the vegetation including germination and growth. The system 400 also allows coupling at least one cylindrical container 102 as shown in FIG. 2 into the at least one aperture 418 of the system 400. A first stage of growth involves growth of seedlings in the substrate, wherein the substrate is snugly positioned inside a cylindrical cavity 106 of the cylindrical container 102 allowing germination of seed and growth of the seedlings to reach a predetermined height. The cylindrical container 102 further comprising a rim 118 and a lid 120, wherein, a plurality of spaced-apart apertures 108*a*, 108*b*, 108*c*, 112*a*, 112*b*, 122*a*, 122*b*, 122*c* for optimum light, air, fluid and nutrition distribution to the vegetation.

Referring next to FIGS. 20-23 of the drawings, an alternative illustrative embodiment of the three-dimensional vegetation growing systems is generally indicated by reference numeral 500.

As shown in FIG. 20, the system 500 includes a liquid reservoir 501 that contains a supply of vegetation growth sustaining liquid including water and nutrients. A reservoir outlet conduit 502 is disposed in fluid communication with the liquid reservoir 501. A manifold 503 communicates with the reservoir outlet conduit 502. The manifold 503 includes a pair of parallel manifold conduits 504. A pair of liquid pumps 505 is provided in the respective manifold conduits 504 to pump the vegetation growth sustaining liquid from the liquid reservoir 501 through the reservoir outlet conduit 502, one or both of the manifold conduits 504, an assembly inlet conduit 508 and an assembly branch conduit 512 of each planter tray assembly 534. Backflow of the vegetation growth sustaining liquid from the assembly inlet conduit 508 may be collected through the backflow conduit 529 into the backflow container 528.

A pressure relief valve 510 is provided in the assembly inlet conduit 508 between the manifold conduits 504 of the manifold 503. A surplus liquid conduit 516 communicates with the pressure relief valve 510. A liquid return container 522 communicates with the surplus liquid conduit 516. A reservoir inlet conduit 524 establishes communication between the liquid return conduit 522 and the liquid reservoir 501. Further a reservoir inlet cap 518 on the reservoir 501, allows adding additional vegetation growth sustaining liquid, such as fluid and nutrients into the reservoir 501.

At least one assembly branch conduit 512, fitted with a branch conduit inlet valve 513, extends from the assembly inlet conduit 508. At least one planter tray assembly 534 is disposed in fluid communication with the assembly inlet conduit 508 through the corresponding assembly branch conduit 512. In some embodiments, at least two planter tray assemblies 534 may be disposed in a stacked configuration to form a vegetation growing tower 544, as illustrated. As illustrated in FIGS. 20 and 21, each planter tray assembly 534 may include an assembly frame 535. As illustrated in FIG. 20, in some embodiments, the assembly frames 535 of multiple stacked planter tray assemblies 534 may be mounted on multiple vertical assembly mount members 541. The assembly frame 535 may have a pair of base frame members 536. Frame arms 537 may extend upwardly from the respective base frame members 536. A planter tray support 538 may be supported by the frame arms 537. At least one planter tray 540 may be supported by the assembly frame 535. In some embodiments, a pair of sloped planter trays 540 may be hinged to the planter tray support 538 at a pair of tray hinges 542. Accordingly, each planter tray 540 may be selectively raised to access the interior components of the planter tray assembly 534. Each planter tray 540 may have a grid construction which supports the growth of plants or other vegetation (not illustrated) and has multiple planter tray openings 548. Each planter tray 540 may be fabricated of or coated with a hydroponic growth medium. In some embodiments, the planter trays 534 may be selectively detachable with respect to the assembly frame 535. Frame end panels 539 may be provided on opposite ends of the assembly frame 535 to maintain moisture within the planter tray assembly 534 and provide moisture discharged from the discharge nozzles 551 to the roots of plants or other vegetation growing on the planter trays 540. The non-absorbed vegetation growth sustaining liquid may drip into an elongated gutter 543 that extends along the bottom of the lowermost planter tray assembly 534 in each vegetation growing tower 544. The liquid return conduit 520 may establish fluid communication between the gutter 543 and the liquid return container 522.

Further according to another exemplary embodiment of the present invention the system 500 allows two stage growth of the vegetation including germination and growth. The system 500 also allows coupling multiple cylindrical containers 102 as shown in FIG. 2 into the multiple planter tray openings 548 of the planter tray 540 of the system 500. A first stage of growth involves growth of seedlings in the substrate, wherein the substrate is snugly positioned inside a cylindrical cavity 106 of the cylindrical container 102 allowing germination of seed and growth of the seedlings to reach a predetermined height. The cylindrical container 102 further comprising a rim 118 and a lid 120, wherein, a plurality of spaced-apart apertures 108*a*, 108*b*, 108*c*, 112*a*, 112*b*, 122*a*, 122*b*, 122*c* for optimum light, air, vegetation growth sustaining liquid such as water and nutrition distribution to the vegetation. Further each of the planter trays 540 may be substituted by the sloped container 200 (FIG. 5) to grow plurality of plants in an aeroponic/hydroponic growth medium.

As further illustrated in FIG. 20, a planter tray distribution conduit 546 may communicate with the assembly branch conduit 512 of each vegetation growing tower 544. The planter tray distribution conduit 546 may be supported in a vertical position in the vegetation growing tower 544. A check valve 547 may be provided in the planter tray distribution conduit 546 to prevent backflow of vegetation growth sustaining liquid. Multiple discharge conduits 550 may be disposed in fluid communication with the planter tray distribution conduit 546. The discharge conduits 550 may extend horizontally within the respective planter tray assemblies 534 in each vegetation growing tower 544. Multiple, spaced-apart discharge nozzles 551 may communicate with each discharge conduit 550. The discharge nozzles 551 may be oriented toward the interior surfaces of the planter trays 540 in the planter tray assembly 534.

Figure 22:
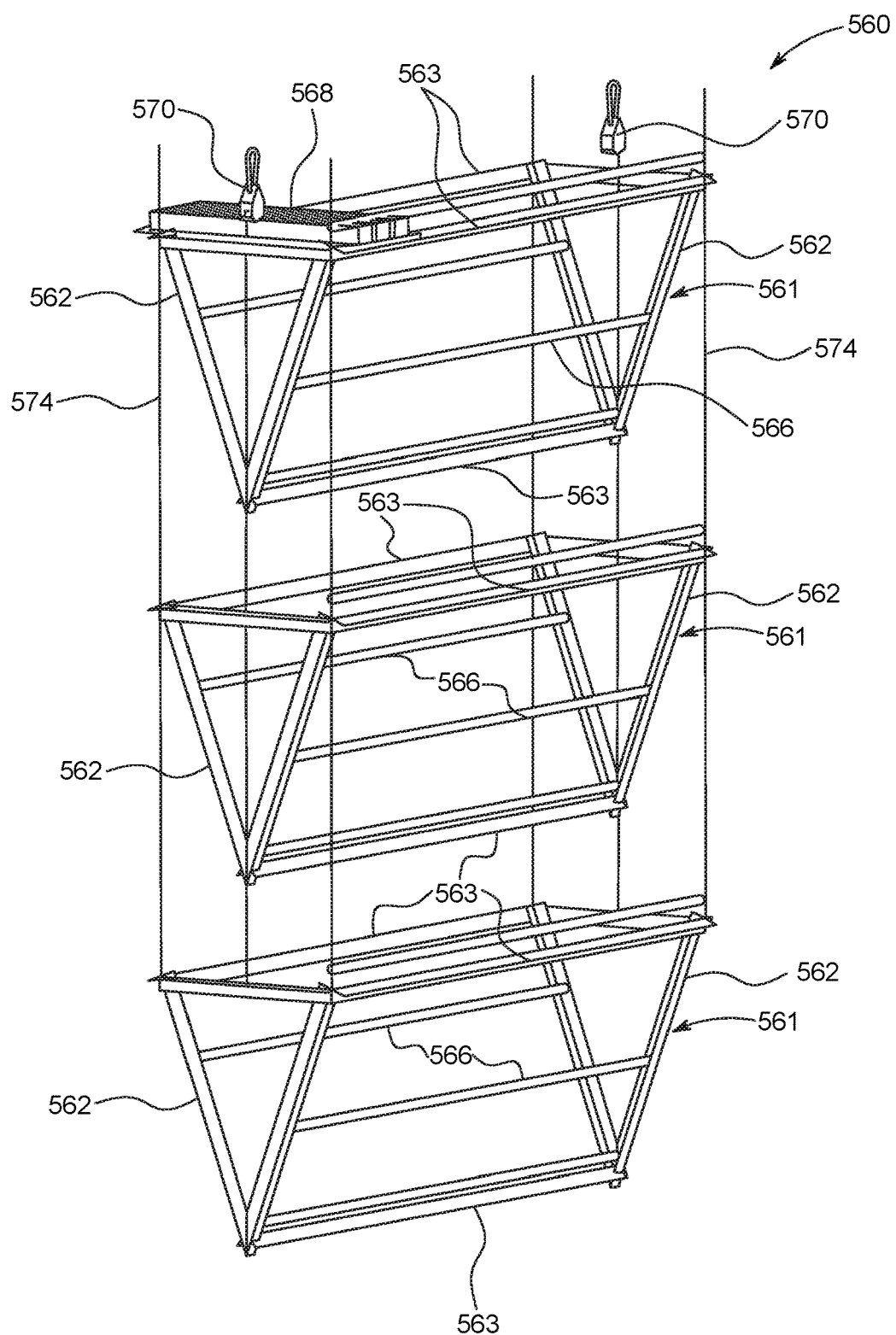
FIG. 22 illustrates a perspective view of an exemplary light fixture of the illustrative three-dimensional vegetation growing system 500.
Figure 23:
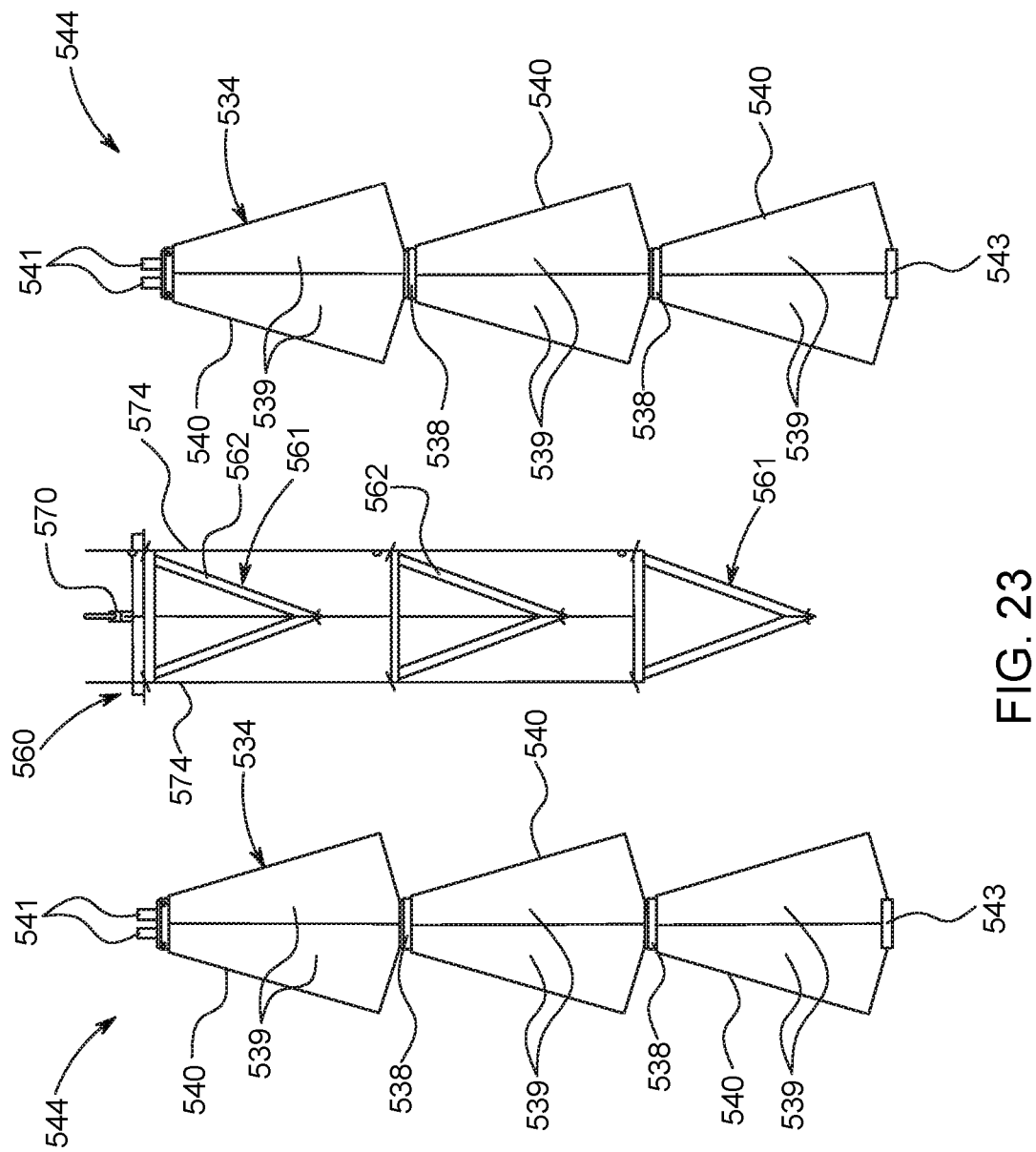
FIG. 23 illustrates a side view of a light fixture suspended between a pair of vegetation growing towers according to the illustrative three-dimensional vegetation growing system 500.

As illustrated in FIGS. 22 and 23, at least one light fixture 560 may be positioned adjacent to each vegetation growing tower 544 in the system 500. In some embodiments, a light fixture 560 may be positioned between each adjacent pair of the vegetation growing towers 544. Fixture suspension cables 574 may suspend the light fixture 560 from a roof or other suitable support structure (not illustrated). As illustrated in FIG. 22, the light fixture 560 may include at least one light fixture frame 561 having a pair of spaced-apart end frame members 562. Multiple connecting frame members 563 may extend between the end frame members 562. Light ballast boxes 568 may be supported by one or more of the light fixture frames 561. The end frame members 562 may be fitted with at least one pair of light sockets (not illustrated) which are electrically connected to the light ballast boxes 568. At least one light source 566 may engage and extend between the light sockets in the respective end frame members 562. In some embodiments, the light source 566 may include at least one source of ultraviolet light. Ratcheting fixture hangers 570 may engage the fixture suspension cables 574 to facilitate selective raising and lowering of the light fixture frames 561.

The vegetation growth sustaining liquid flows from the assembly branch conduit 512 through the planter tray distribution conduit 546 and the discharge conduits 550 in the respective planter tray assemblies 534 of each vegetation growing tower 544. The vegetation growth sustaining liquid is discharged from each discharge conduit 550 through the discharge nozzles 551 and onto the interior surfaces of the respective planter trays 540 of each planter tray assembly 534. Accordingly, the vegetation growth sustaining liquid is applied to the roots of the vegetation to sustain metabolism and growth of the vegetation. The light fixtures 560 are operated to emit light from the light sources 566 (FIG. 22) onto the vegetation to promote photosynthesis in the vegetation.

In some embodiments, the planter trays 540 may be selectively detached from the assembly frame 535 of each planter tray assembly 534 to facilitate removal of the vegetation from the planter trays 540. The planter trays 540 may be pivoted to an open position at the respective tray hinges 542 to facilitate access to the interior components of each planter tray assembly 534 for cleaning, maintenance and/or replacement purposes.

Figure 24:
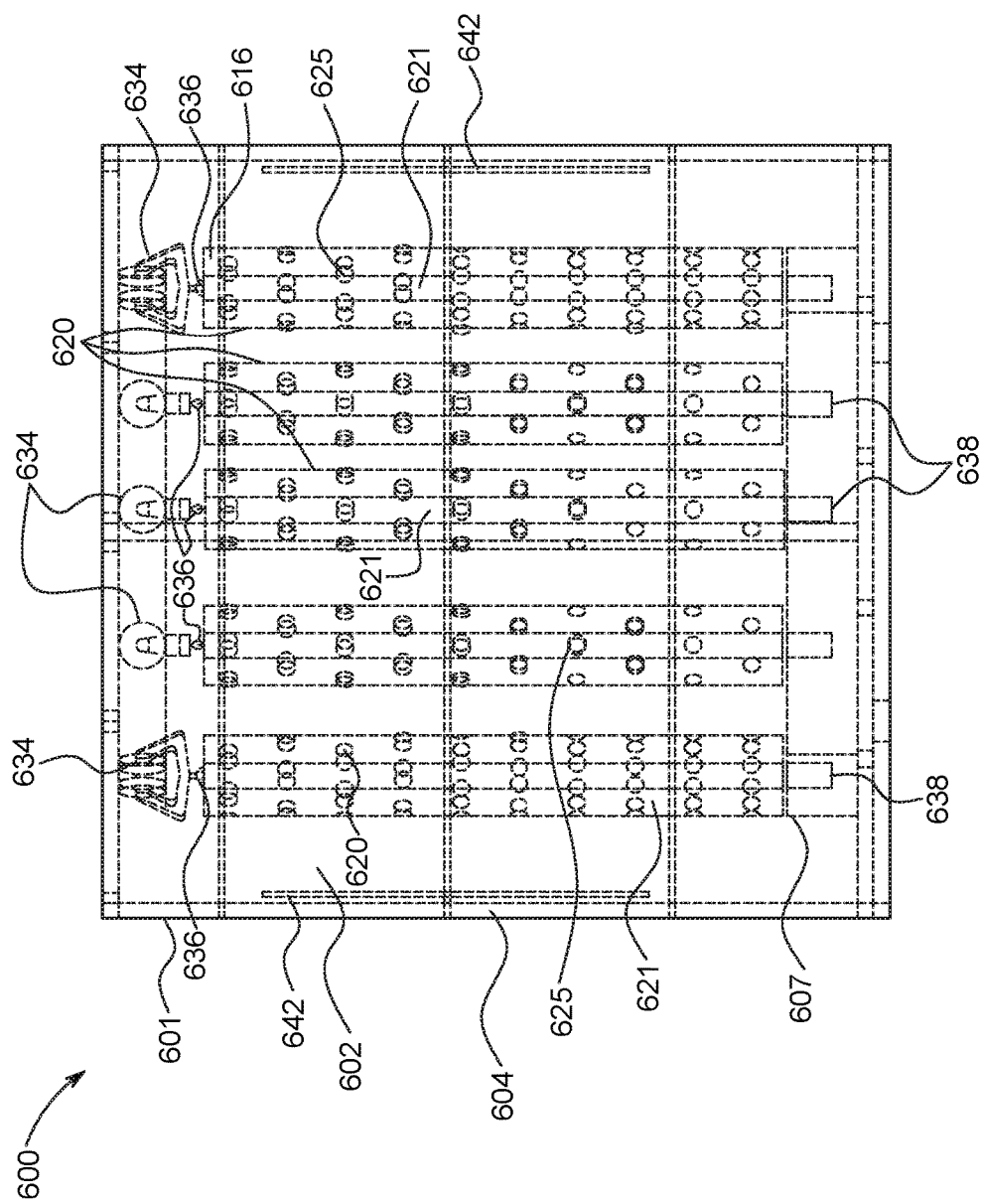
FIG. 24 illustrates a side view of another alternative illustrative embodiment of the three-dimensional vegetation growing systems 600.
Figure 25:
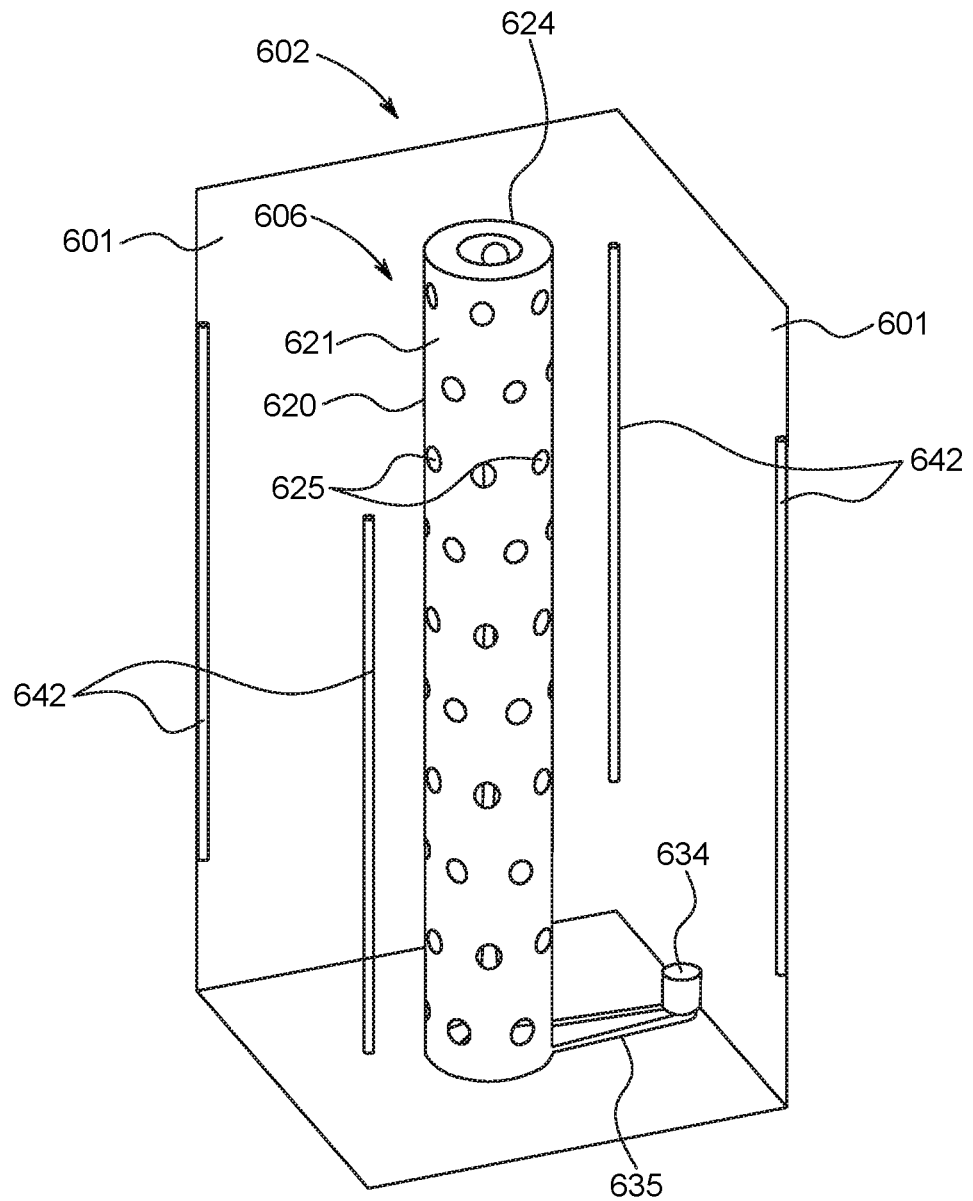
FIG. 25 illustrates a perspective view of an exemplary liquid dispensing tower of the tower assembly according to the illustrative three-dimensional vegetation growing system 600.
Figure 26:
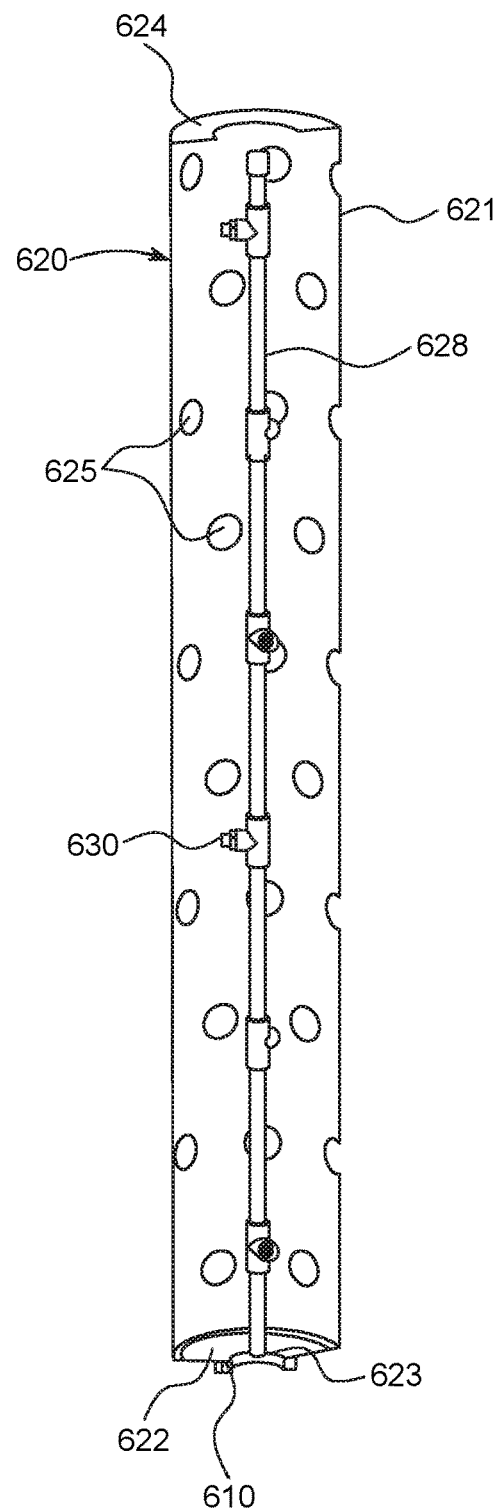
FIG. 26 illustrates a longitudinal sectional view of an exemplary liquid dispensing tower according to the illustrative three-dimensional vegetation growing system 600.

Referring next to FIGS. 24-26 of the drawings, another alternative illustrative embodiment of the three-dimensional vegetation growing system is generally indicated by reference numeral 600.

As illustrated in FIG. 24, the system 600 includes a system housing 601 having a system housing interior 602. At least one planter tower 620 is provided in the system housing interior 602 in light-receiving proximity to at least one light source 642. The planter tower 620 extends upwardly from the tower assembly base 607. In some embodiments, multiple planter towers 620 may extend from the tower assembly base 607 in spaced-apart relationship to each other. A tower assembly cap 616 is provided in the system housing interior 602. The tower assembly cap 616 is attached to the system housing 601. The planter towers 620 may be mounted between the tower assembly base 607 and the tower assembly cap 616. In some embodiments, the planter towers 620 may be mounted for selective multi-positional capability along and between the tower assembly base 607 and the tower assembly cap 616. Further at least one access door 604 may be provided in the system housing 601 to facilitate access to the system housing interior 602 and its contents.

As illustrated in FIGS. 24 and 25, a tower rotation motor 634 drivingly engages the tower shell 621 of each planter tower 620 for rotation of the tower shell 621. As illustrated in FIG. 24, in some embodiments, each tower rotation motor 634 may directly engage each corresponding tower shell 621 through a drive shaft 636. As illustrated in FIG. 25, in other embodiments, the tower rotation motor 634 may drivingly engage the tower shell 621 for rotation through a drive belt 635. Accordingly, as the vegetation growth sustaining liquid is discharged from the fluid discharge nozzles 630 (FIG. 26) on the tower conduit 628, the tower rotation motor 634 rotates the tower shell 621. The discharged vegetation growth sustaining liquid is discharged through the liquid dispensing openings 625 as the liquid dispensing openings 625 periodically align or register with the fluid discharge nozzles 630. The base interior 610 of the tower assembly base 607 may accommodate the tower rotation motors 634, further a plurality of tower shell 621 may drivingly engage with the tower rotation motor 634 to rotate all the tower shells 621 simultaneously, fluid inlet conduits 638, pumps, reservoirs and/or other structure associated with operation of the three-dimensional growing system 600 as well as selective positioning of the planter towers 620 along the tower assembly base 607.

As illustrated in FIG. 25, at least one light source 642 may be provided in the housing interior 602. The light sources 642 may be connected to a suitable electrical source (not illustrated) to emit light which supports the growth of vegetation in the system housing interior 602. In some embodiments, the light sources 642 may include at least one source of ultraviolet light. A tower assembly 606 may be provided in the system housing interior 602. In some embodiments, the tower assembly 606 may include a plurality of tower shells 621 connected to rotate simultaneously along a generally elongated and elliptical/circular shaped conveyor (not shown) connected to the respective tower assembly base 607.

As illustrated in FIG. 26, each planter tower 620 may include a generally elongated, cylindrical tower shell 621 having a shell lower end 622 and a shell upper end 624. The tower shell 621 may be adapted to rotate on a bearing 623 which may be situated on or between the outer base wall 608 and the inner base wall 609 of the tower assembly base 607. Multiple liquid dispensing openings 625 may extend through the tower shell 621 in a selected size, pattern and spacing. The tower shell 621 of each planter tower 620 may be fabricated of or coated with a hydroponic growth medium.

As further illustrated in FIG. 26, a tower conduit 628 may extend within and along the tower shell 621. In some embodiments, the tower conduit 628 may be generally concentric with the tower shell 621. A fluid inlet conduit 638 (FIG. 24) is disposed in fluid communication with the tower conduit 628. The fluid inlet conduit 638 communicates with a pump and supply mechanism (not illustrated) for a vegetation growth sustaining liquid. At least one fluid discharge nozzle 630 is disposed in fluid communication with the tower conduit 628. In some embodiments, multiple fluid discharge nozzles 630 may be provided along the tower conduit 628 at a selective spacing with respect to each other. The fluid discharge nozzles 630 may be oriented in various directions away from the tower conduit 628 to facilitate discharge of the vegetation growth sustaining liquid under pressure through the liquid dispensing openings 625 in the tower shell 621.

In typical application of the three-dimensional vegetation growing system 600, the roots of plants or other vegetation (not illustrated) are attached to the tower shell 621 of each planter tower 620 according to the knowledge of those skilled in the art. The three-dimensional vegetation growing system 600 may be particularly suitable for growing basil. Light is emitted from the light sources 642 (FIG. 25) in the system housing 601 and strikes the vegetation. As each tower rotation motor 634 is operated to rotate the tower shell 621 of each corresponding planter tower 620, a supply of vegetation growth sustaining liquid which may include at least one nutrient is pumped through the fluid inlet conduit 638 (FIG. 24) and the tower conduit 628 (FIG. 26) of the planter tower 620. The vegetation growth sustaining liquid is discharged from the fluid discharge nozzles 630 through the liquid dispensing openings 625 of the rotating tower shell 621 and onto the roots of the vegetation 646. Accordingly, the vegetation growth sustaining liquid sustains metabolism and growth of the vegetation. The planter towers 620 of the tower assembly 606 in the system housing interior 602 and the vegetation growing on the planter towers 620 may be accessed through the access door 604 (FIG. 24). It will be appreciated by those skilled in the art that rotation of the tower shells 621 of the respective planter towers 620 may facilitate uniform exposure of the vegetation to the light emitted from the light sources 642 with reduction of the overall consumption of power and generation of heat in the system housing interior 602.

Further according to another exemplary embodiment of the present invention the system 600 allows two stage growth of the vegetation including germination and growth. The system 600 also allows coupling at least one cylindrical container 102 as shown in FIG. 2 into the at least one liquid dispensing openings 625 of the tower shells 621 of the system 600. A first stage of growth involves growth of seedlings in the substrate, wherein the substrate is snugly positioned inside a cylindrical cavity 106 of the cylindrical container 102 allowing germination of seed and growth of the seedlings to reach a predetermined height. The cylindrical container 102 further comprising a rim 118 and a lid 120, wherein, a plurality of spaced-apart apertures 108a, 108b, 108c, 112a, 112b, 122a, 122b, 122c for optimum light, air, vegetation growth sustaining liquid such as water and nutrition distribution to the vegetation.

Non-limiting examples of aeroponic/hydroponic growth media may include organic or inorganic fiber materials; wheat chaff or any chaff from harvesting a product such as oats, barley, etc.; rice hull or other hull material; hay such as grass, alfalfa, etc.; hydroton (fired clay pellets); rock wool; oak leaves; composted soil material; perlite; pumice stone; fired brick chip; hydro gel; sand; gravel of various sizes; or any combination thereof.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A two-stage aeroponic growing system, the system comprising:
  at least one cylindrical container comprising a generally cylindrical sidewall that forms a generally cylindrical cavity, the cylindrical sidewall defined by a plurality of spaced-apart, elongated side apertures, a closed end defined by a plurality of spaced-apart end apertures, and an open end terminating at a circumferential edge, whereby a rim extending around the circumferential edge of the at least one cylindrical container;
  a cylindrical lid defined by a first face, a second face, and a plurality of lid apertures, the cylindrical lid configured to engage the circumferential edge of the at least one cylindrical container, the cylindrical lid further configured to regulate access to the cylindrical cavity of the at least one cylindrical container;
  a sloped container comprising a tray that forms at least one drain hole, the tray surrounded by a first wall, a pair of lateral walls and a generally sloped second wall, the walls having an upper free edge, the tray and the walls forming a cavity, further the sloped container comprising at least one fluid supply hole;
  a curved lid having a sloped surface and a circumferential edge configured to mount on to the upper edge of the walls of the sloped container, the sloped surface of the curved lid comprises a central horizontal plane surface and a plurality of gradually sloped plane surfaces from both sides of the central horizontal plane surface, whereby each of the gradually sloped plane surfaces are at a predetermined gradient from the adjacent plane surface, further each of the plane surfaces comprises a plurality of rows of evenly, spaced-apart holes which are configured to enable holding at least one cylindrical container, whereby the rim engages the curved lid allowing the at least one cylindrical container fixedly coupled to the sloped container at a predetermined angle; and
  at least one nozzle attached to the fluid supply hole of the sloped container, wherein the at least one nozzle is configured to controllably spray a fluid in the cavity of the sloped container.

2. The system of claim 1, further comprising a substrate configured to fit snugly in cylindrical cavity of the at least one cylindrical container, the substrate comprising a block of mineral fibers including Grodan® plug.

3. The system of claim 1, wherein height of the cylindrical container ranges from about 1.5 to 2 inches and circumference of the cylindrical container is about 2 inches.

4. The system of claim 1, wherein the rim extends up to about 1 inch around the circumferential edge of the cylindrical container.

5. The system of claim 1, wherein the lid apertures include a central flower-shaped aperture and a concentric series of elongated openings surrounding the flower-shaped aperture.

6. The system of claim 1, wherein a closed end of the cylindrical container includes a flower-shaped aperture.

7. The system of claim 1, wherein the cylindrical lid detachably attaches in a perpendicular disposition in relation to the cylindrical sidewall, thereby allowing access to the cylindrical cavity of the cylindrical container to deposit, remove, or manipulate the substrate inside the cylindrical cavity.

8. The system of claim 1, wherein the sloped container has a length of about 15 inches and a breadth of about 10 inches, a height of the first wall is about 5 inches and a height of the sloped second wall is about 2.5 inches.

9. The system of claim 1, wherein the sloped container is made of materials selected from the group consisting of metals and polymers.

10. The system of claim 1, wherein the pair of lateral walls of the sloped container slope from the first wall to the second wall at about a 3° angle and the curved lid slopes at about a 3° angle, thereby when the curved lid is attached to the sloped container the combination of both slopes forms about a 6° gradient.

11. The system of claim 10, wherein the predetermined gradient of the sloped plane surfaces is sloped between about 3 to 27 degrees from the central horizontal plane surface of the curved lid, thereby creating greater space for receiving multiple cylindrical containers.

12. The system of claim 1, wherein the discharge of fluid from the at least one nozzle is programmable.

13. The system of claim 1, wherein the discharge of fluid from the at least one nozzle is remotely controlled.

14. The system of claim 1, wherein the at least one nozzle is operationally connected to at least one hole on the tray, the first wall, the second wall or at least one of the pair of lateral walls to thereby coordinate spraying fluid and nutrients to the vegetation.

15. The system of claim 1, wherein the system further comprises at least one external fluid pressure line connected to at least one hole on the tray.

16. A method for aeroponic growing of vegetation in two stages, the method comprising:
providing a substrate for growing vegetation, the substrate comprising a block of mineral fibers and defined by a restricted volume;
providing a cylindrical container having a continuous cylindrical sidewall that forms a cylindrical cavity, an open end, and a closed end, the cylindrical container comprising a rim extending around circumferential edge of an open end of the at least one cylindrical container;
positioning the substrate in the cylindrical cavity in a snug relationship;
initiating a first stage of growth of the vegetation;
providing a sloped container comprising a tray surrounded by a first wall, a pair of lateral walls, and a generally sloped second wall, the walls having an upper free edge, wherein the tray and the walls form a cavity, the sloped container comprising at least one fluid supply hole and at least one drain hole;
providing a curved lid having a sloped surface and a circumferential edge configured to mount on to the upper edge of the walls of the sloped container, the sloped surface of the curved lid comprises a central horizontal plane surface and a plurality of gradually sloped plane surfaces from both sides of the central horizontal plane surface, whereby each of the gradually sloped plane surfaces are at a predetermined gradient which form an adjacent plane surface, each of the plane surface comprises a plurality of rows of evenly, spaced-apart holes;
coupling the cylindrical containers to the sloped container through the plurality of holes on the sloped surface of the curved lid, whereby the rim of the cylindrical containers engage the sloped surface, thereby allowing the closed end of each of the cylindrical containers angled towards a center of the cavity of the sloped container while the open end of each of the cylindrical containers is angled outwards from the curved lid of the sloped container;
initiating a second stage of growth of the vegetation;
spraying a fluid into the cavity of the sloped container by at least one nozzle attached to the at least one fluid supply hole; and
draining excess fluid from the sloped container through the at least one drain hole.

17. The method of claim 16, wherein the pair of lateral walls of the sloped container slope from the first wall to the second wall at about a 3° angle and the curved lid slopes at about a 3° angle, thereby when the curved lid is attached to the sloped container the combination of both slopes forms about a 6° gradient.

18. The method of claim 16, wherein the holes on the curved lid are circular to match the cylindrical shape of the sidewalls of the cylindrical container, whereby the cylindrical containers are force-fit into corresponding holes on the curved lid, thereby allowing the rim of the cylindrical container to rest on the surface of the curved lid.

19. The method of claim 16, wherein the spraying of the fluid from the at least one nozzle is programmable and remotely controlled.

20. The method of claim 16, wherein the predetermined gradient of the sloped plane surfaces is sloped between about 3 degrees to 27 degrees from the central horizontal plane surface of the curved lid, thereby creating greater space for receiving multiple cylindrical containers.

* * * * *